United States Patent [19]
Hensley

[11] Patent Number: 4,760,592
[45] Date of Patent: Jul. 26, 1988

[54] WIRE TAP DETECTION DEVICE WITH PASSIVE TESTING

[75] Inventor: Robert P. Hensley, Sunnyvale, Calif.

[73] Assignee: Secom General Corporation, Southfield, Mich.

[21] Appl. No.: 832,262

[22] Filed: Feb. 21, 1986

Related U.S. Application Data

[63] Continuation-in-part of Ser. No. 699,359, Feb. 7, 1985, Pat. No. 4,634,813.

[51] Int. Cl.[4] ............................................. H04M 1/68
[52] U.S. Cl. .............................................. 379/7; 379/6
[58] Field of Search ............ 179/81 R, 81 E, 175.3 R; 379/6, 7, 32, 34, 387, 442, 24, 35, 184, 161, 168; 340/825.5

[56] References Cited

U.S. PATENT DOCUMENTS

| | | | |
|---|---|---|---|
| 3,751,606 | 8/1973 | Kaiser, Jr. ........................... | 179/175.3 |
| 3,904,839 | 9/1975 | Peoples ........................... | 179/175.3 F |
| 4,110,572 | 8/1978 | Cochrane ........................ | 179/175.3 R |
| 4,186,282 | 1/1980 | Ellson ............................ | 179/175.3 R |
| 4,197,435 | 4/1980 | Jackson et al. ................ | 179/175.3 R |
| 4,218,592 | 8/1980 | Steinbergs et al. ............... | 179/81 E |
| 4,229,626 | 10/1980 | Peoples ......................... | 179/175.3 F |
| 4,304,970 | 12/1981 | Fahey et al. ..................... | 179/81 R |
| 4,413,163 | 11/1983 | Basini .......................... | 179/175.3 R |
| 4,611,101 | 9/1986 | Walter et al. ................. | 179/175.3 R |

FOREIGN PATENT DOCUMENTS 7620649 6/1976 France .
2068682 8/1981 United Kingdom .

*Primary Examiner*—James L. Dwyer
*Attorney, Agent, or Firm*—Gifford, Groh, Vanophem, Sheridan, Sprinkle and Dolgorukov

[57] ABSTRACT

The device of the present invention discloses an electrical circuit which is electrically connected to a telephone line or data line between the telephone line or data line and the telephone set. In operation, the device continuously measures various electrical properties of the telephone or data line while a signal is passively generated on to the telephone or data line by simulating an on-hook to off-hook and back again condition of the telephone handset.

44 Claims, 12 Drawing Sheets

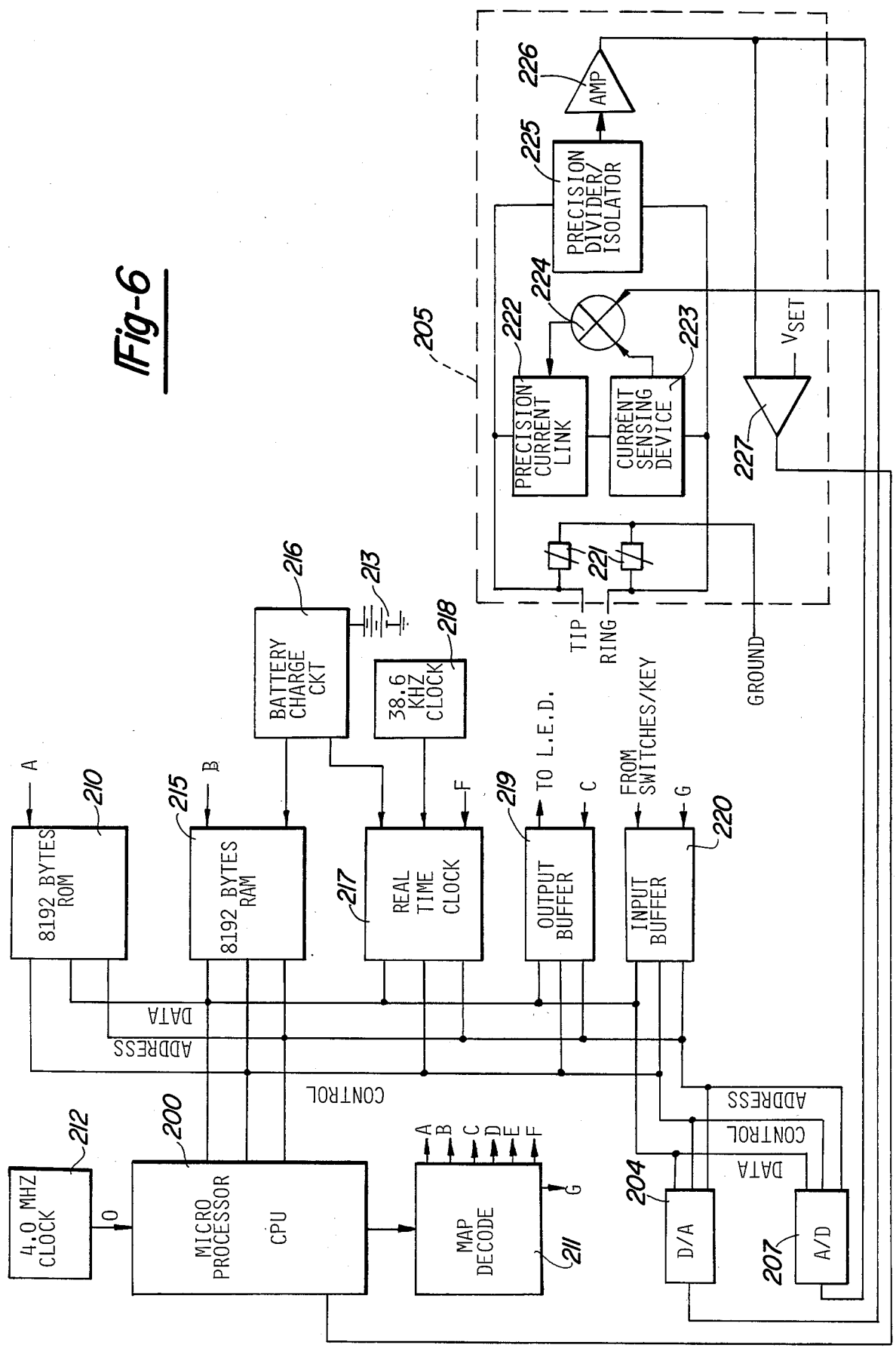

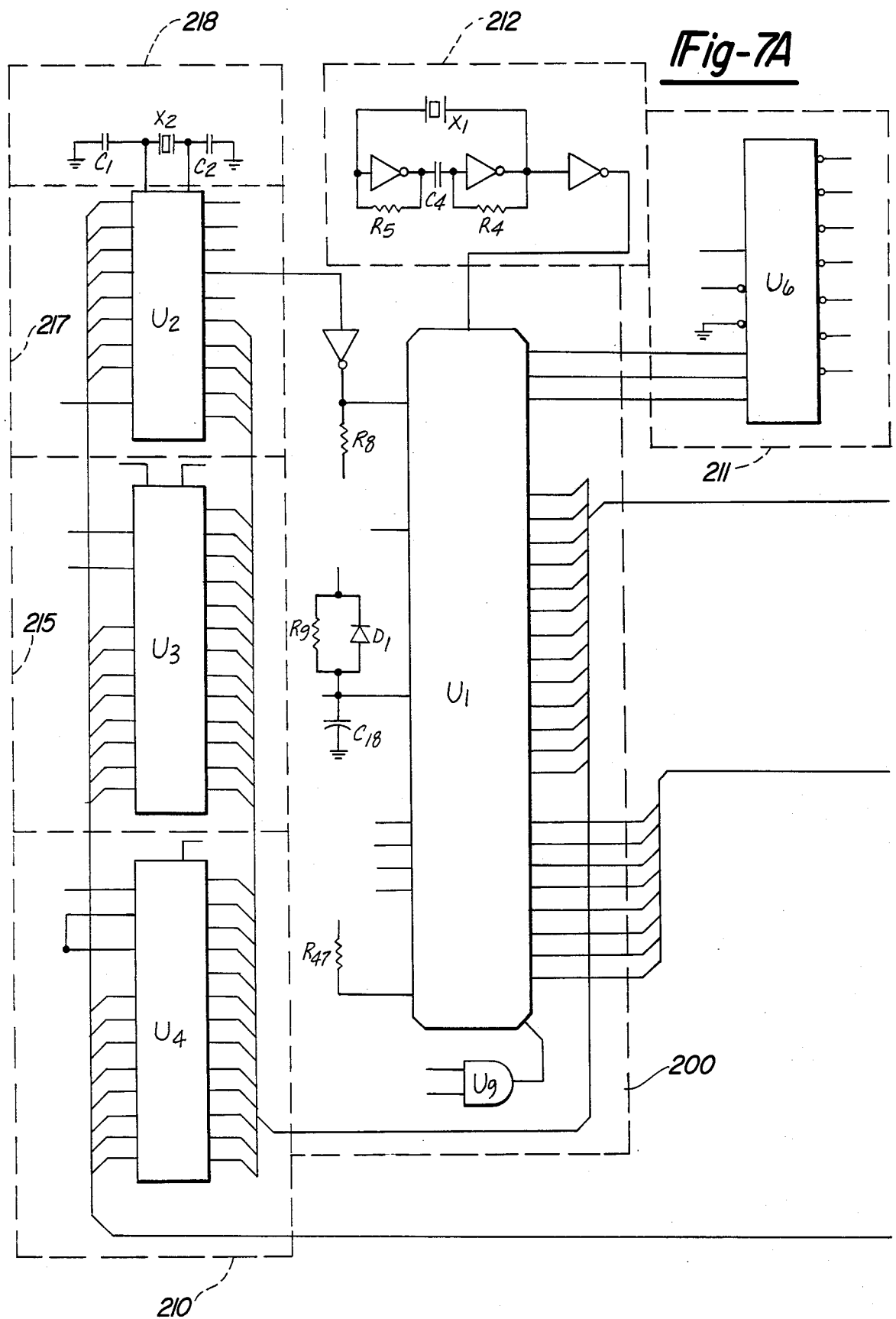

WIRE TAP DETECTION DEVICE WITH PASSIVE TESTING

BACKGROUND OF THE INVENTION

I. Cross References To Related Applications

The present application is a continuation in part of my earlier filed copending application for a "Wire Tap Detection Device", filed Feb. 7, 1985 under, Ser. No. 06/699,359 now Pat. No. 4,634,813. The specification of said earlier filed copending application to the extent not repeated, is specifically incorporated herein.

II. Field of the Invention

The present invention relates to a device for detecting the presence of an intruder listening device on a telephone line or the like.

III. Description of the Prior Art

In order to maintain compatability between telephone systems throughout the world, the telephone lines for virtually all telephone systems share common electrical characteristics. These electrical characteristics include the impedance of the line, the electrical resistance of the line, the line voltage and the closed loop current of the line. Furthermore, these electrical characteristics will vary depending on whether the telephone receiver is either on the hook or off the hook.

Most types of intruder listening devices, i.e., wire taps, alter one or more electrical characteristics of the telephone line when the intruder listening device is attached across the telephone line. Thus, measurement of the electrical characteristics of the telephone line will reveal the presence or absence of most types of intruder listening devices.

There have been previously known devices which, when attached to the telephone lines, measure certain electrical characteristics of the telephone line in order to detect an intruder listening device. These previously known testing devices, however, are both bulky and expensive in construction. Furthermore, such devices are only periodically used to test the telephone lines for intruder devices so that an intruder listening device on the telephone line will remain undetected until the next scheduled test of the telephone line.

SUMMARY OF THE PRESENT INVENTION

The present invention provides a device for detecting the presence of an intruder listening device which overcomes all of the above mentioned disadvantages of the previously known devices.

The device of the present invention comprises a microprocessor based electrical circuit which is electrically connected to the telephone line between a telephone set and the telephone line. Read Only Memory in the electrical circuit contains both the computer program for the microprocessor as well as a data table which represents the electrical characteristics of a conventional telephone line. In addition, an analog to digital converter has an input which is selectively connected to the telephone line under the control of the microprocessor and generates a digital output data signal representative of microprocessor selected electrical characteristics of the telephone line.

In operation, the microprocessor continuously measures various electrical characteristics of the telephone line using the A/D converter, and then compares the measured data with the data stored in the Read Only Memory. Whenever the average of the measured input signal varies from the value stored in the Read Only Memory by a predetermined amount, the microprocessor activates a display advising the user of the presence of an intruder listening device on the telephone line.

In one embodiment of the invention, the circuit includes one, and preferably several, signal generators capable of, while under the control of the microprocessor, transmitting a wave form into the telephone line. An A/D converter integrates the reflected signal from the telephone line and provides a digital representation of the integrated reflection as data to the microprocessor. The microprocessor then compares the measured reflected signal against a previously measured reflected signal. A variation between the previously measured reflected signal and the currently measured signal greater than a predetermined amount is indicative that a listening device using a high inductive/capacitive voltage switching mechanism is attached to the telephone line. In this case, the microprocessor again generates an output signal to a display advising the user of the presence of an intruder device.

The device of the present invention is compact and relatively inexpensive in construction. Furthermore, in the preferred installation, the device is permanently installed between the telephone handset and the telephone line, thus providing constant and reiterative monitoring of the telephone line.

BRIEF DESCRIPTION OF THE DRAWINGS

A better understanding of the present invention will be had upon reference to the following detailed description wherein like reference characters refer to like parts throughout the several views and in which:

FIG. 6 is a more detailed block diagram of the construction shown in FIG. 5;

FIGS. 7A and 7B are a schematic diagram of an actual embodiment of the invention disclosed in FIGS. 5 and 6;

It is to be understood that the invention is not limited in its application to the details of construction and arrangement of parts illustrated in the accompanying drawings, since the invention is capable of other embodiments, and of being practiced and carried out in various ways within the scope of the claims. Also, it is to be understood that the phraseology and terminology employed herein is for the purpose of description, and not of limitation.

DETAILED DESCRIPTION OF THE PRESENT INVENTION

Figure 1:
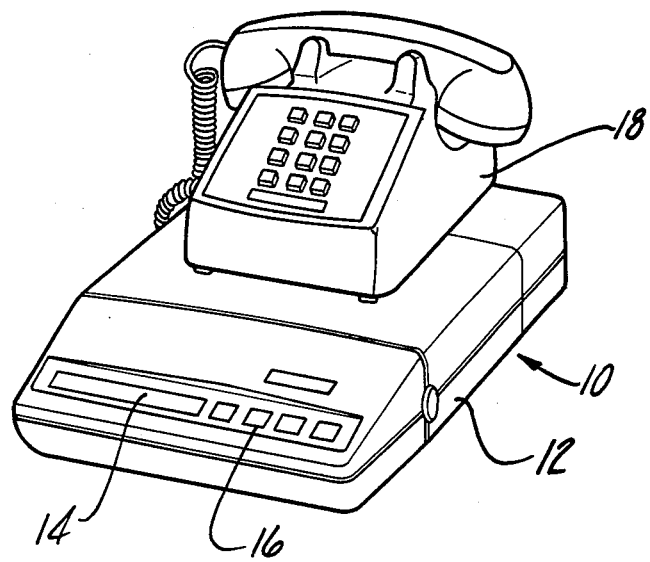
FIG. 1 is an elevational view illustrating one embodiment of the invention installed on a telephone handset.

With reference first to FIG. 1, one embodiment of the intruder detection device 10 of the present invention is thereshown and comprises a housing 12 in which an electrical circuit is contained. The electrical circuit will be subsequently described in greater detail. The device 10 includes an electronic display 14, such as a light emitting diode (LED) or liquid crystal display (LCD), as well as a keyboard 16 mounted to the housing 12 so that the display 14 is readable, and keyboard 16 is readable from outside the housing 12. The housing 12 also includes a back panel (not shown) having two plugs. The output plug from a conventional telephone set 18 is secured into one of the plugs, while the other plug is secured into the electrical connection for a telephone line.

Figure 2:
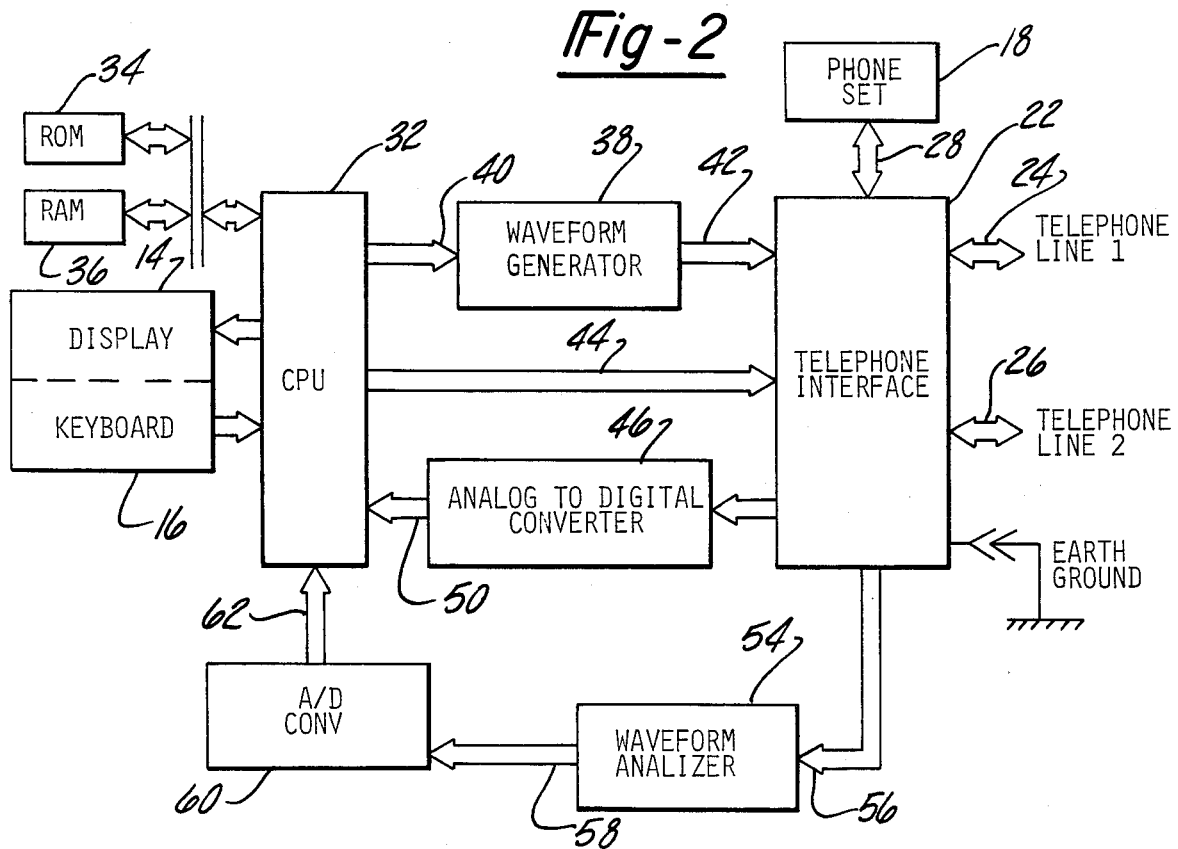
FIG. 2 is a block view illustrating the circuit of the embodiment of the present invention shown in FIG. 1.

With reference now to FIG. 2, a block diagram of the preferred circuit of the present invention is thereshown and includes a telephone interface 22 which is electrically connected to at least one telephone line 24 and preferably also to a second telephone line 26. The telephone interface is also electrically connected by a line 28 to the telephone receiver 18 so that all communications from the receiver 18 and to either telephone line 24 and 26 pass through the interface 22.

Still referring to FIG. 2, a central processor 32, preferably a microprocessor, operates under the control of a computer program stored in Read Only Memory (ROM) 34. Random Access Memory (RAM) 36 is also addressable by the processor 32 for the temporary storage and retrieval of data and the like.

A wave form generator 38, which will be subsequently described in greater detail, receives control signals at its input 40 from the processor 32 and generates output wave forms on its output 42 to the telephone interface 22. Thus, under control of the processor, the wave form generator 38 generates predetermined wave forms on either the telephone line 24 or 26. A control line 44 between the processor 32 and the telephone interface 22 controls, among other things, to which telephone line 24 or 26 the wave form generator 38 transmits a signal.

Still referring to FIG. 2, an analog to digital (A/D) converter 46 has its input 48 electrically connected to the telephone interface 22. The output 50 from the A/D converter 46 produces a digitally encoded signal read as data by the processor 32 under control of its computer program. The A/D converter 46 thus produces a digitally encoded signal on its output 50 indicative of various electrical characteristics of the telephone lines 24 and 26. These electrical characteristics include the impedance, resistance, voltage and closed loop current of the telephone lines 24 and 26. The precise characteristic being measured by the A/D converter 46 is determined by a control signal on line 44 from the processor 32 and to the telephone interface 22.

Still referring to FIG. 2, a waveform analyzer 54, which will be subsequently described in greater detail, has its input line 56 electrically connected to the telephone interface 22 and thus to the telephone line 24 or 26. The output 58 of the wave form analyzer 54 is fed as an input signal to a second A/D converter 60 which provides a digital signal on its output 62 to the microprocessor 32. As will be subsequently described in greater detail, the wave form analyzer 54 together with the A/D converter 60 analyzes the reflection of the signal generated by the wave form generator 38 on the telephone line 24 or 26.

Still referring to FIG. 2, the processor 32 is electrically connected and controls the display 14 on the housing 12. Similarly, the keyboard 16 is electrically connected to the processor 32 and provides inputs to the processor 32 depending upon the depression of any of the keyboard keys.

Figure 3:
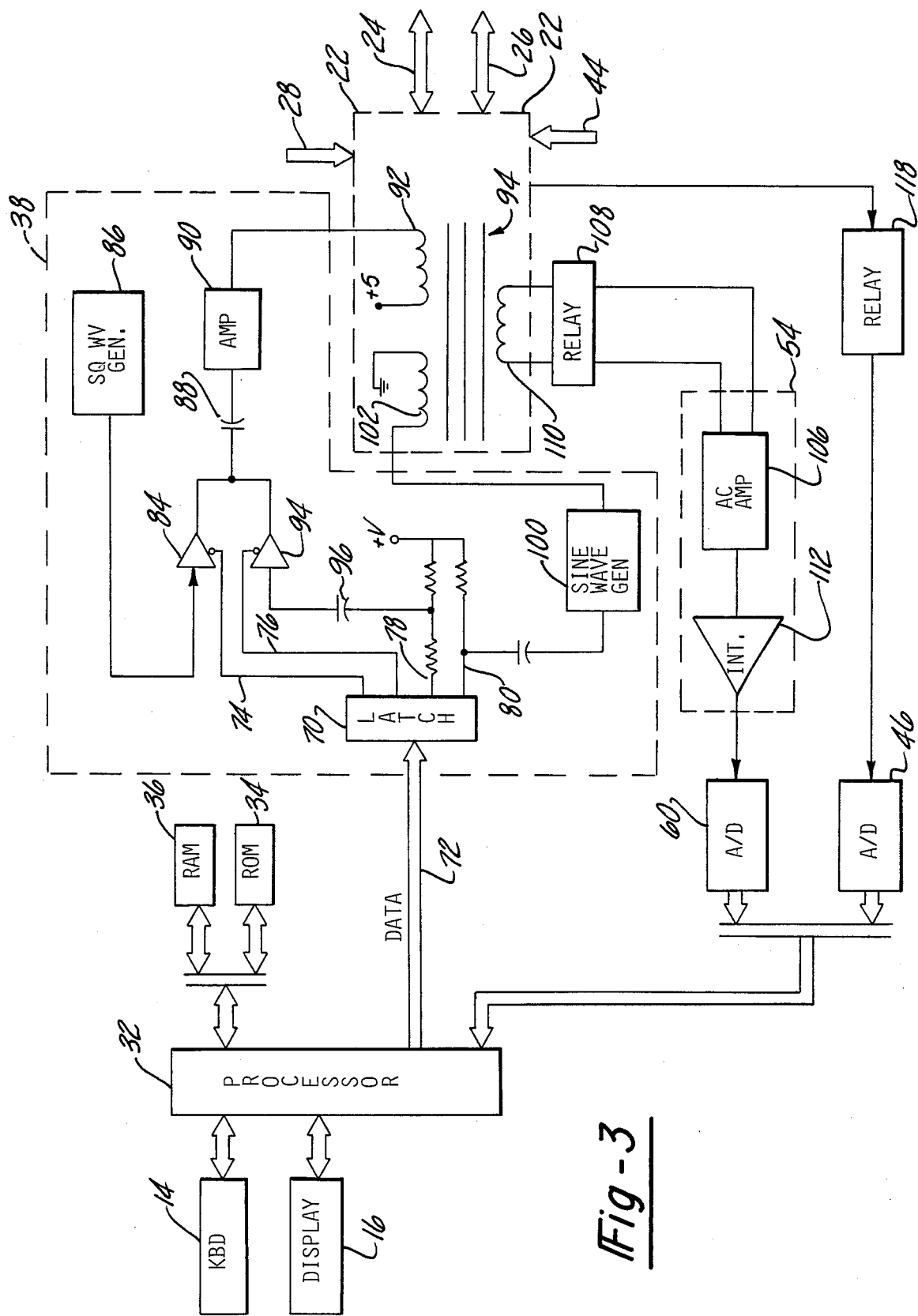
FIG. 3 is a circuit diagram of one embodiment of the invention.

With reference now to FIG. 3, the circuit and particularly the wave form generator 38 and wave analyzer 54 are thereshown in greater detail. The wave form generator 38 includes a four bit latch 70 which receives a data signal on its input line 72 from the processor 32. The latch 70 includes four outputs 74, 76, 78 and 80 which are used to selectively generate one of three different signals into the telephone line 24 or 26.

The latch output 74 is coupled to an enable input of a buffer 84 while a square wave generator 86 is coupled to the input of the buffer 84. Thus, when the buffer 84 is enabled by the latch output 74, a square wave from the square wave generator 86 passes through the buffer 84, a decoupling capacitor 88 and to an amplifier 90. The output from the amplifier 90 is connected to a coil 92 of a transformer 94 in the telephone interface 22. The transformer 94 is inductively coupled to the telephone line 24 or 26, depending upon the control signal on line 44 from the CPU so that the square wave 86 is transmitted to the telephone line 24 or 26.

Similarly, the latch output 76 is connected to the enable input of a second buffer 94 while the input to the second buffer 94 is coupled through a capacitor 96 to the latch output 78. The outputs from the second buffer 94 and the first buffer 84 are coupled through the capacitor 88 and amplifier 90 to the transformer coil 92.

The latch outputs 76 and 78 are utilized to generate a triangular wave form on the telephone line 24 or 26. To accomplish this, the latch output 76 is maintained at a low level while the latch output 78 is reiteratively switched by the processor 32 between a high and low level. With the latch output 78 at its high level, a capacitor 96 charges from a voltage source V thus producing an upwardly sloped ramp signal to the input of the buffer input 94. Conversely, when the latch output 78 is switched to its low level, the capacitor 96 discharges thus producing a downwardly ramped signal. Consequently, by reiteratively switching the latch output 78 between its high and low levels while enabling the buffer 94 by the latch output 76, a triangular wave is transmitted to the telephone line 24 or 26.

Lastly, the latch output 80 is used to activate a sinusoidal wave generator 100 having its output connected to a second coil 102 of the tranformer 94. Any conventional sign wave generator, such as an audio amplifier, can be used.

The capability of transmitting three different wave forms onto the telephone line is advantageous for detecting different types of intruder listening devices. For example, the sine wave generator generates a signal between 200 and 10,000 Hz and is used to detect tone actuated intruder devices. Most tone actuated devices employ a phase locked loop or RC detector which is activated by a sine wave.

Conversely, the triangular wave form is the most efficient and noise free wave form for transmitting energy into an inductive circuit such as the telephone line. the triangular wave form is used as the signal source for the pulsed power reflector test.

Lastly, the square wave form is used to activate pulse activated intruder listening devices. The square wave is most efficient for this purpose due to its fast rise and fall times. Moreover, whenever an intruder listening device is activated, one or more electrical characteristics of the telephone line will change and such change will be detected by the device of the present invention. Still referring to FIG. 3, the waveform analyzer 54 includes an amplifier 106 having its input connected through a relay 108 to a pickup coil 110 in the transformer 94. The output from the amplifier 106 is fed to the input of an integrator 112 and the output from the integrator 112 is fed as an input to the A/D converter 60.

The wave form generator 38 works in conjunction with the analyzer 54 to measure the overall inductive reactance of the telephone line 24 or 26. In essence, the waveform generator 38 geneates either a triangular, square or sinusoidal wave to the telephone line 24 or 26 via the transformer 94. The signal then passes to the central telephone switching station and is reflected back through the telephone line 24 or 26. This reflected signal is then inductively detected by the transformer coil 110, amplified by the amplifier 106 and integrated by the integrator 112. This integrated reflected signal is then converted to digital form by the A/D convertor 60 and fed as an input signal to the processor 32. It is, of course, well known that the presence of a high voltage switching device employed by some intruder listening devices will vary the overall inductive reactance and thus the attenuation of the reflected signal produced by the wave form generator 38.

Still referring to FIG. 3, the first A/D converter 46 is also connected to the interface 22 by a relay 118. The relay 18, when actuated by the processor 32, enables the A/D converter 46 to measure other electrical characteristics of the telephone line 24 or 26. These other electrical characteristics include the resistance, voltage and closed loop current of the telephone line 24 and 26 in both the on hook and off hook states.

Figure 4:
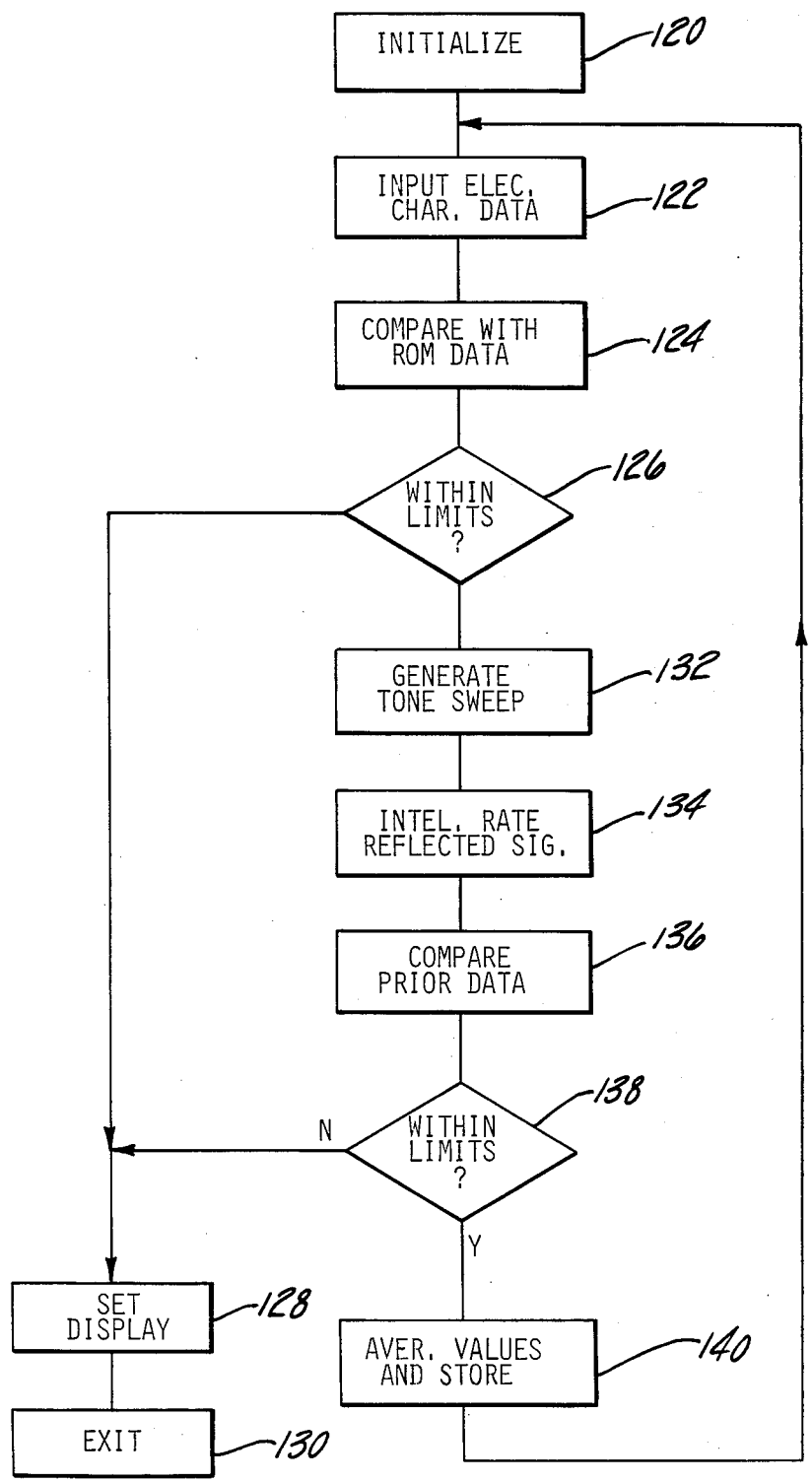
FIG. 4 is a flow chart of a computer program for the embodiment of the present invention shown in FIG. 1.

With reference now to FIGS. 1 and 4, in operation the telephone interface 22 is first connected to the telephone lines 24 and 26 and the telephone handset line 28 is also connected to the telephone interface 22. The user, by depressing the appropriate key on the keyboard 16 at step 120, instructs the processor 32 to initialize. During the initialization step 120, the processor 32 under control of the computer programs stored in the ROM 34 measures the line resistance, voltage and closed loop current at step 122 of each telephone 24 and 26. As each electrical characteristic of both telephone lines 24 and 26 are measured and converted to digital form by the A/D converter 46, the processor 32 at step 124 compares the measured signal with the value of the standard or expected signal which is also stored in the data table of the ROM 34. At step 126, the processor 32 determines whether the measured signal is within a predetermined tolerance of the expected value. If the measured value is not within a predetermined tolerance of the expected or standard value, step 126 exits to step 128 and warns the user that an intruder listening device is present on the telephone line. The computer then exits from the test loop at step 130.

Assuming that the electrical characteristics, i.e., the resistance, closed loop current and line voltage are within acceptable standards, the processor 32 then generates the triangular, square and sinusoidal waveforms at step 132 to each telephone line 24 and 26. At step 134, the waveform analyzer 54 analyzes and then integrates the reflected signal from the central telephone switching station and compares the integrated reflected signal at step 136 with the previously determined value from the initialization step 120. If the measured reflected signal is within a predetermined tolerance of the previously measured reflected signal, step 138 exits to step 140 where the old and new values for the reflected signals are averaged and restored as the old signal. Step 140 then exits to step 122 and repeats the above-identified process. Conversely, if the measured signal is outside the acceptable limits, step 138 instead exits to step 128 whereupon the display 14 is activated advising the user of the presence of an intruder listening device on the telephone line and then exits to step 130.

The averaging of the new and old values of the reflected signal at step 140 enables the circuit to track normal long range changes in the line impedance without erroneously atibuting such long range changes to an intruder listening device.

Relays 108 and 118 are selectively actuated under control of the microprocessor 32 to selectively electrically connect the A/D converters 60 and 46 to the telephone line for measuring the plurality of electrical characteristics of the telephone line. Still other relays (not shown) in the interface 22 are actuated under control of the microprocessor 32 for selectively testing one telephone line 24 or the other telephone line 26.

A primary advantage of the device of the present invention is that the processor 32, under control of its computer program, continuously and reiteratively checks the electrical characteristics as well as performing the wave form generator test on both telephone lines 24 and 26. As such, the device of the present invention provides continuous protection against unwanted intruder listening devices on the telephone lines.

A still further advantage of the present invention is that the device is compact, relatively inexpensive and simple to use. No experience or technical expertise, whatsoever, is required to use the device of the present invention since, once an intruder listening device is detected on the telephone line, the processor 32 generates a simple message on the display 14 warning the user of the intruder device.

A listing for the computer program for the processor (Z-80) is shown below.

```
Program Listing:
B. TYPE SUBS.HEX
:10000000EOODSFOD3F1212808SEA647777EH8C23C
:100010001E003E0047777EB8C21E00C226002100A6
:100020001036SFC30000031FF0B21000083E041605C7
:10003000BEC28500C6Q92315C23000DBF51FDA55A4
:100040000CDBA027B1FD25B0013153CD1106CD2D
:100050008402C33B00214207CD440521C087E17D2
:10006000D26A00DBF71F1FD27300DBF51FD26A00D4
```

```
:10007000C38200DBF51FD27300214A06CD4405CDB3
:100080008402C3F100211408336FF2336FFCDBA02E3
:10009000781FD2A1000132253CD1106CD8402C38551
:1000A00000DBF51FDAB000215606CD4405C3A100E0
:1000B0002106083631CD4D042106087EFE31C2D21C
:1000C0000000211408360021180811300BCD3205C36C
:1000D000E0002115083600211808114008CD32052E
:1000E00021000836042336023361623361F233607
:1000F00028CD44042162063CD440521060B7E21074F
:1001000010077CD4404CD1605CD8402C3A702218506
:1001100006CD4405CD1605CDCD022110087ED601B1
:100120004721180B7E1602CD3906781FD23801012
:1001300056C4CCD1106C302012111087ED602472178
:100140001908B7E1604CD39067B1FD25601015054B5
:10015000CD1106C3020212112087ED60247211A08DA
:100160007E1604CD3906781FD27401014752CD1195
:1001700006C302012113087ED60147211B087E1603
:1001800002CD3906781FD29201014C43CD1106C32E
:10019000020121E07CD4405CD16052120B06008E
:1001A0003E80D3F0CD560577D604D614FAB30104B9
:1001B000C3AA017E487E90779172377215A07CD0D
:1001C00044050EFFCD2006CD56052120B84623356AB
:1001D000CD3906781FDAF20179210410CDC3050D5F
:1001E000C2C4012136072CD4405CD1605CD1605C381
:1001F00020101414CD1106C302012166072CD441D
:100200000005CD1605215008060003E80D3F0CD5605D9
:1002100077D604D614FA1C0204C313027E487E90DB
:10022000077917237725508CD56057721500B4651
:100230002356CD39067817DA4902DBF0E60FFE0FB8
:10024000CA2502CD8402C3A7022155087E060016E6
:100250007CD39067817D27B022155087E06071688E
:1002600011CD39067817D27202013345CD1106C37C
:100270000102013245CD1106C3010201314SCD1104
:1002800006C30102DBF0E60FFE0FC2B402DBF0E6DC
:10029000FFE0FCABD02DBFC47CD2405DBF0E60F21
:1002A000FE0FC29C0276C91FD20E01 1FD2FB011F94
:1002B000D202031FD2B703C3F1003E40D3F0CD56A4
:1002C00005060A1696CD39063E00D3F0C92110085E
:1002D0003E80D3F0CD560577233E40D3F0CD560572
:1002E000772332E20D3F0CD560577233E80D3F0CD43
:1002F000160053E90D3F0CD560577CD16053E00D3BA
:10030000F0C9218506CD440521080B3600CDCD026F
:100310002191060CD4405CD1605CD1605CD1605CD8A
:10032000B60521100811808CDA703CD8402E604F4
:10033000FE04CAF100219D06CD4405CD1605CD165B
:1003400005CD1605CDB60521110811908CDA7035S
:10035000CD8402E604FE04CAF10021A906CD4405BD
:10036000CD1605CD1605CD1605CDB60521120B1101
:100370001A08CDA703CD8402E604FE04CAF10021C9
:100380000B506CD4405CD1605CD1605CD1605CDB661
:1003900052113081118CDA703CD8402E604FEE6
:1003A00004CAF100C302037E210D10CDC305EB7E0E
:1003B0002104101CDC305C92106087EFE31C2020406
:1003C0002179060CD4405CD1605CD84021FD2E9035F
:1003D0002115087E1FDAE9031118081400BCD32E3
:1003E00052106083637C3F10021060B363CD4D0C
:1003F00041140082119080CD3205211508036000324
```

```
:10040000E0002179063CD4405CD1605CD84021FD22A
:100410002B042114007E1FDA2B041118082130084O
:10042000CD3205210608363103F10021060836331E8
:10043000ED4D04113008211908CD32052114083637D
:10044000000C3E003E00D3F03E0BD3F1C921090701
:10045000CD4405CD16053E80D3F0CD1605CD56050D
:100460000650161ECD3906781FD2750421F106CD2F
:100470004405C3560406OFCD16053E10D3F0CD1625
:100480005E390D3F0CD1605CD1605CD5605FE06DA
:10049000F2A30405C27A0421CD06CD4405CD16058C
:1004A000C37A043E40D3F0CD5605FE64FABB042166
:1004B000D906CD4405C3A704CD1605CDBF04C92177
:1004C0006087E21001077211507CD4D05CDCD0200
:1004D00011180821100BCD3705212007CD4D053E04
:1004E00080D3F0CD5605FE5OF2DF04CD1605CDCDFC
:1004F0002111C082110OBCD37O5212B07CD4D0511
:100500003E80D3F0CD5605FE1EFA005CD1605211E
:100510003607CD4405C9D511FFFF1DC21A0515C206
:100520001A05D1C9D511FF031DC2290515C2280511A
:10053000D1C9E0FC3390SE047EEB77EB23130DE3
:10054000C2390509E0C11001OCD3905C90E0B11A9
:10055000011OCD3905C9CD1605C5010200DBF5E650
:100560004FE04CA5DO5DBF247DBF5E604FE04C2C7
:100570006905DBF5E604FE04CA7205DBF2B8C25A6F
:100580005ODC2680C5C1C9CD1605C5010200DBF520
:10059000E608FE08CA8E05DBF447DBF5E608FE0830
:1005A000C29A05DBF5E608FE08CAA305B8C28B05AA
:1005B000DC29905C1C90E0C210010362O230DC2B1
:1005C000BDO5C9C5D501000011000FD2D4051E1E
:1005D00035C3D6051E30E67FFE64FAE30504D66413
:1005E000C3D805FE0AFAEE050CD60AC3E305577B10
:1005F000FE00C2FB05362028C30063E30B0772B31
:100600003E30B1772B3E30B2772B362E2B73D101D3
:10061000C9C5216E06CD4D05C1210010712370C9D9
:1006200016FF593E08D3F11DC22706SE0AD3F159E1
:100630001DC23006150206C95BB8CA470643046F
:10064000150239060GFFC90600C9204D5241AC416A
:10065000204S4E4F48502020594S4B2048435449F8F
:10066000575320594441455220202034F4C2020CD
:10067000202020524F5253453F204D455453397F
:1006800032057454E474E494B524F720S4494EE1
:1006900054S4741544C4F56204S4E4C2020452
:1006A000544C41620205049542045554C415628
:1006B0002047T4E495220455S4C41562050AF4F1F
:1006C0004C3F2053S9S320454E494C203220416S
:1006D000202020483S449575320204D4E554F49
:1006E0005247204F4E202042202020483S4495753
:1006F0005220204547741544C4F562040F4E3F2053E6
:100700004953204S4E494C2032205449E4920402DF2
:10071000455353952020454E494C20415441449F
:10072000204E4F48502054464943202020S5010
:100730005520474E4143A202020455414C504D5
:100740004F432A2AAC49416204945574F5020020C4
:10075000202474E49SO4545575320202020037
:100760002003D145524620474E4954441A45598A
:02077000S645EC
:0000000000
```

In a modification of my device, using recently available circuit components, it is possible to perform a test on the telephone line using a single type of passively generated wave form, rather than the three waves forms previously actively generated, and also to audit and print out the line characteristics, which was not possible before. This can be done because by using more sophisticated components, the modified device no longer needs to activate the intruder listening device in order to watch a voltage drop, it is only necessary to watch how the line is reacting to the change imposed on it i.e., to watch the reaction of the line to a passively generated avalanche pulse. It is to be understood that the reaction of the line to a passively generated pulse is what I choose to call the "reactance" of the telephone line.

For the purposes of understanding the balance of the present application, and the difference between the active testing previously described, and the passive testing now being described, it is necessary to understand the difference between "active testing" and "passive testing". "Active testing" is the active application of external signals or voltage levels to a known device such as a telephone or a telephone line, which in turn causes a measurable change in said device. The recorded change or deviation from the norm can then be used to evaluate the device or equipment's characteristics.

"Passive testing" means testing without the inducement of external voltages or signals. One merely puts the device or equipment through its normal sequence of operations and observes the reaction of said device to the sequence. The passively generated avalanche pulse which is observed in this modification of my device is produced by the components R41, R42, Q1, and D6 shown in FIG. 7B. The components R41, R42, and Q1 act as a voltage controlled resistor, thus having the same effect on the line as a standard telephone set. This modification of my device does not actively generate signals into the telephone line, but instead it measures the already existing 50 volts supplied by the phone company. The change that this voltage undergoes while a simulated telephone set (R41, R42, Q1, D6 of FIG. 7B), is brought from an on to off hook condition and back, is the raw reactance measurement.

In other words, a voltage drop is not needed when one can, by using much faster electronic components, merely watch the voltage change. Since one had to watch a voltage drop with the previously described device, one had to generate all three types of pulses i.e., triangular, square and sine to try and activate all three known types of bugs. Since the invention does not have to activate the bugs now, it can use a single avalanche pulse. This is possible because of the significant increase in speed and resolution which has been brought about by the substitution of the wave form analyzer by the A/D converter.

Figure 12:
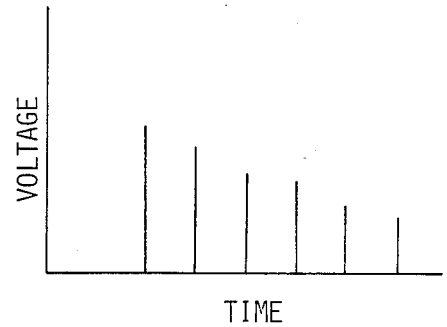
FIG. 12 is chart showing an actual printout of the values read from the test of the telephone line illustrated in FIG. 11 after an intruder device has been installed thereon.
Figure 11:
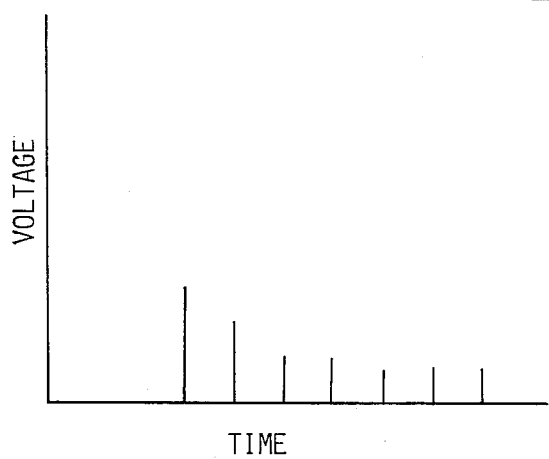
FIG. 11 is a chart showing an actual printout of the values read from a telephone line under test by an actual embodiment of the present invention.

An example of the telephone lines reactance to an an intruder listening device can be seen by referring to FIGS. 11, and 12, which are charts of time versus change in voltage. It can be seen that if the chart of FIG. 11 is taken as a graph of a particular unbugged telephone lines reaction to an avalanche pulse, it can be seen that the slope of the chart of FIG. 12 is steeper, meaning an increase in capacitance on the line, and if such increase is more than a predetermined value, it is indicative of a capacitive type tap being placed on the line.

Figure 5:
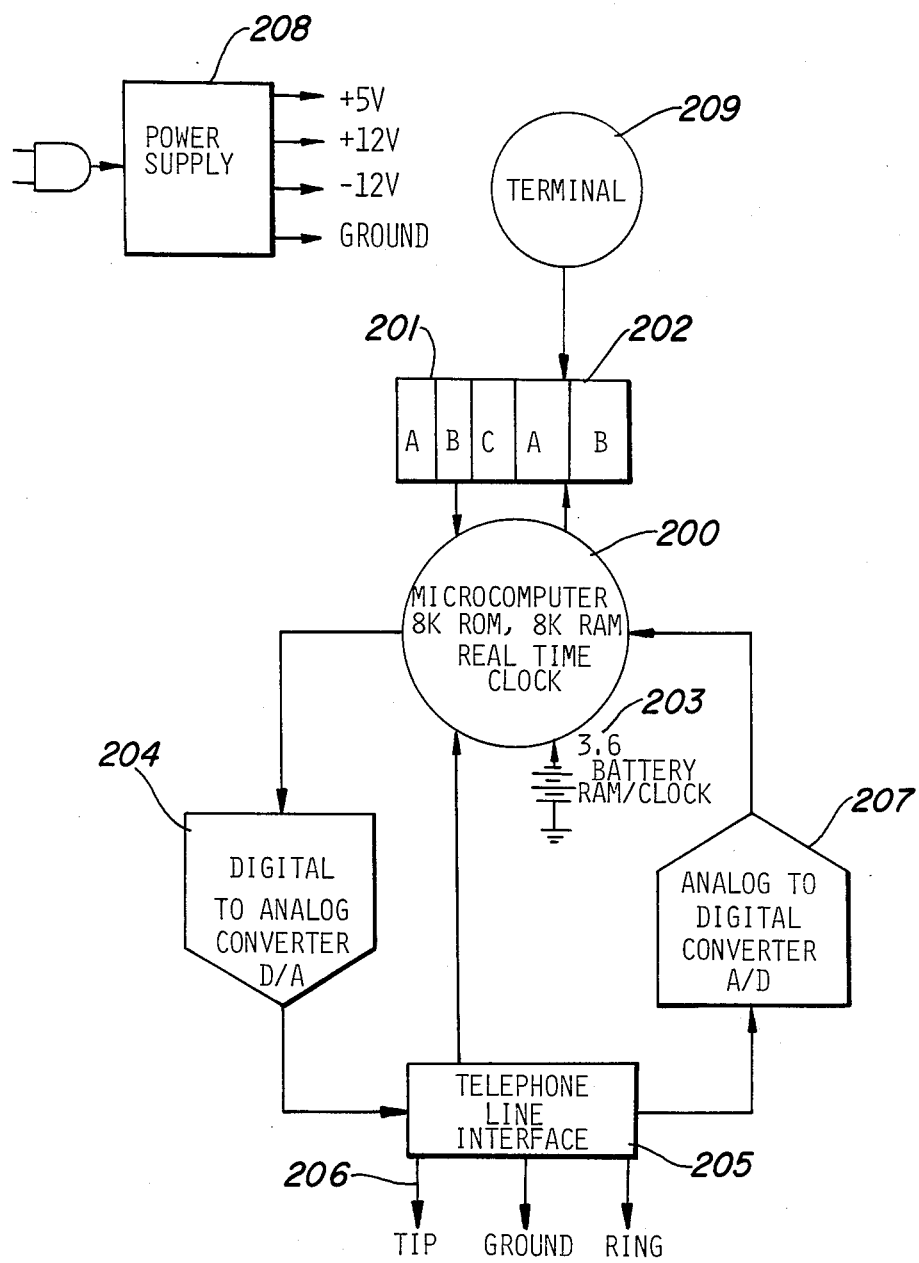
FIG. 5 is a block diagram of a modification of the present invention using passively generated signals.

Referring now to FIGS. 5 and 6, a block diagram of the modification of my invention is shown. As before a Z-80 microprocessor 200 is at the center of the system. Also as before, a series of indicating means, such as light emitting diodes 201 A-C, to be described in greater detail hereinafter, are connected to the microprocessor 200 through output buffer 219, as push buttons 202 are connected through input buffer 220. A battery charge circuit 216 is connected to the RAM 215 to provide back-up power to the RAM memory. A D/A converter 204 is connected to the microprocessor to generate pulses into the telephone line 206 through the telephone interface 205.

The frequency at which a pulse is passively generated on the telephone line so that a test can be preformed is under the control of the microprocessor, which has been programmed by the manufacturer. It is preferred that a test be performed every 3 minutes on a continuous 24 hour basis independently of the values of on-hook and off-hook voltage; and all times when the mode/audit pushbutton 202B is depressed. The lines reactance to the generated pulse is determined with the aid of the analog to digital converter 207 which is connected between the telephone interface 205 and the microprocessor 200. A suitable power supply 208 is indicated as being provided, and a computer terminal 209 for auditing purposes, which will be described in more detail hereinafter, is also provided.

Still referring to FIGS. 5 and 6, the microprocessor 200 and the ROM 210 instruct the digital to analog convertor 204, and combine circuits in the precision current sink 222, the current sensing device 223, and the error amplifier 224, to affect the telephone line in a predetermined sequence of operations. A surge supressor 221 prevents possible damage to the device by telephone line transient voltages.

The effect of these operations on the line, represented as line voltage changes, are converted to digital values by the combination of the precision divider isolator 225 the amplifier 226 and the A/D convertor 207.

The digital values are stored in the RAM 215 thus creating a file memory which is a digital representation of the line tested. The next time a test (voltage, current, or reactance) is performed, the line is put through the same sequence of events. Line data is stored in a temporary file which is then evaluated along with previously stored line data to determine if a significant change has occurred.

If a significant enough change has occurred, the user is alerted via the indicator lights 201A, 201B and 201C.

The unit has a real time clock 217 whose value is reset upon initialization. The clock interrupts the microprocessor 200 at regular intervals, and through a predetermined set of instructions in the ROM 210 the microprocessor provides a mathematical upkeep of the line file data in the RAM 215. This upkeep prevents false triggering due to normal telephone line changes.

Figure 7B:
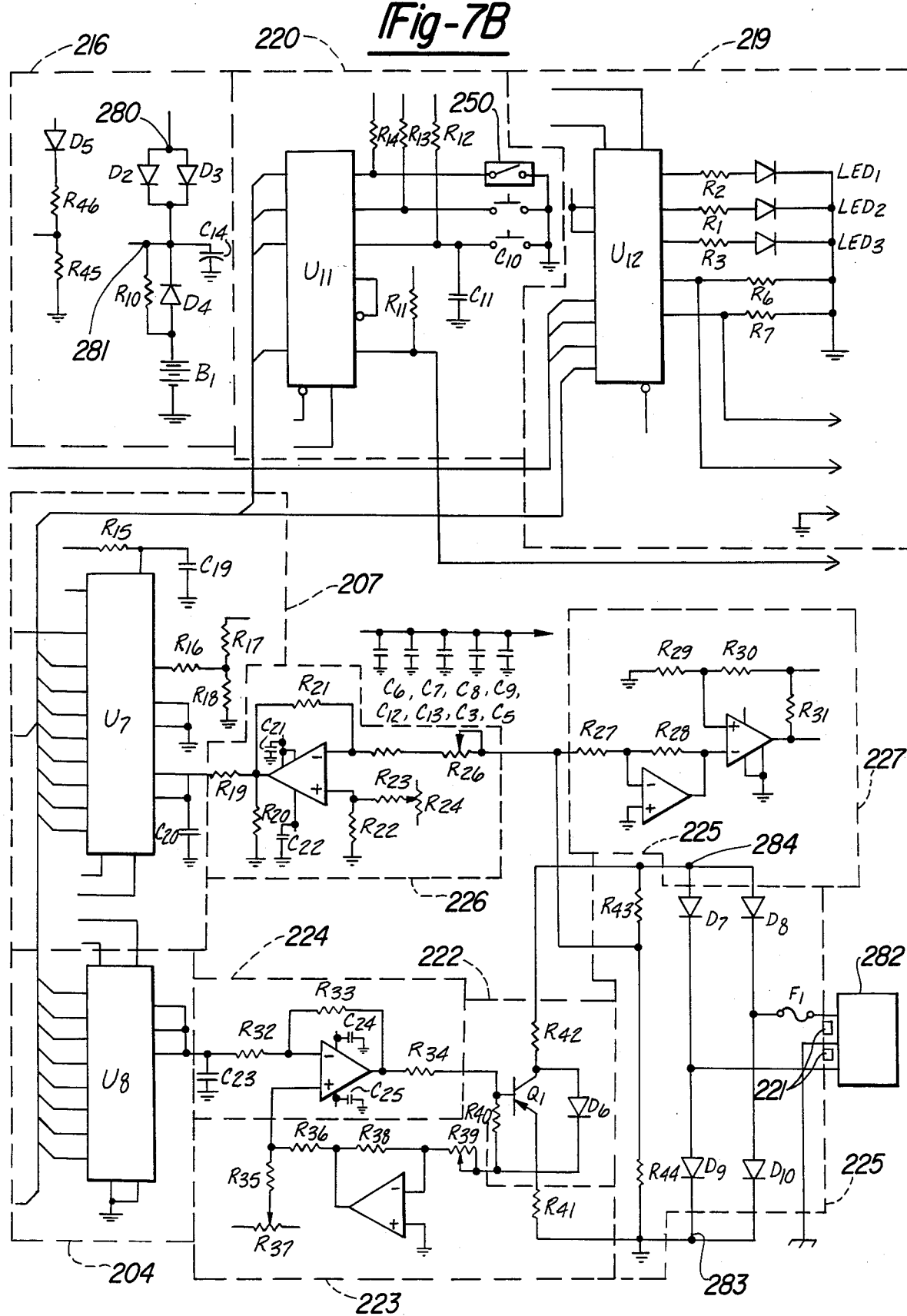

A more detailed description of the circuit operation can be had by referring to FIGS. 7A-B. The unit operates under the control of the microprocessor 200 which accesses instructions out of the 8192 byte ROM 210. The microprocessor runs on a clock circuit 212 which provides a 4.0 mhz square wave to the processor's clock input.

Upon power up, the microprocessor 200 starts program execution at location 0000 (all address lines 0). The first part of the program, as will be explained later, is a self test in which data is transferred between the ROM 210, the microprocessor 200 and the RAM 215, thus checking all internal data address control wires and the map decode circuitry 211. The retention of data by the RAM 215 in a power down condition is the job of the battery charge circuit 216 and battery B1. Under normal operation the battery is charged through D2, D3 and R10. R10 provides a current limited charge, while $D_2$ and $D_3$ insure voltage flow from the main five volt buss 280 to battery buss 281, but not the reverse. C14 keeps noise to a minimum, and D4 lessens the voltage drop from B1 to battery buss to 0.7 volts.

Now the RAM 215 is read at certain addresses and checked for certain data. If the data is valid, the unit is assumed to have retained its telephone line date properly, as will be discussed hereinafter.

The unit then checks to see if a phone line is connected. This is done by a measurement of the line input for voltage. A phone line is connected to the RJ-11 type connector 282. Said line possesses a DC voltage potential which is polarized by diodes D7, D8, D9 and D10 so that the result is a positive potential at 283 and a negative potential at connector 284.

This analog voltage is then divided by resistors 43 and 44 and then the voltage is applied to R26. The amplifier 226 aids in multiplying the voltage resulting in an overall voltage division of five. R22, R23 and R24 provide a means of setting a 0 input for 0 output. This final voltage is applied to one side of R19 which sets the input impedance of the A/D converter 207. This voltage is then converted to a digital value by the A/D converter thus allowing the microprocessor to read this digital representation of the line voltage.

Control of the line by the unit is done in a similarly reverse way. Data is written by the microprocessor 200 into the digital to analog convertor 204, which converts to an analog voltage output. This output is set into one end of the error correcting amplifier 224. The output of the error correcting amplifier provides control voltage to the base of Q1 which starts to conduct. As the on resistance of Q1 decreases (base voltage increases) the circuit precision current sink starts to pull line current. The greater the digital value at the digital to analog converter 204, the greater the amount of current drawn. The current sensing device 223 provides a measurement of the current drawn by the current sink 222 and feeds that into the error amplifier 224, thus holding the current at a stable value.

The unit is operated via the pushbuttons 202 and the secure/nonsecure key 250. The microprocessor 200 reads the buffer 220, the contents of which represent the electrical status of the buttons and key 250. This information is tested by the microprocessor 200 for the desired condition. When a condition is met, program operation is interrupted, and processing resumes elsewhere in the program.

Similarly, data is written from the microprocessor to the output buffer 219 where the output is applied to the indicator lights 201A–C. If a one is present, an indicator light is lit, while if a zero is present, the light is off. This provides a means for the microprocessor 200 to inform the user of a change.

Figure 8A:
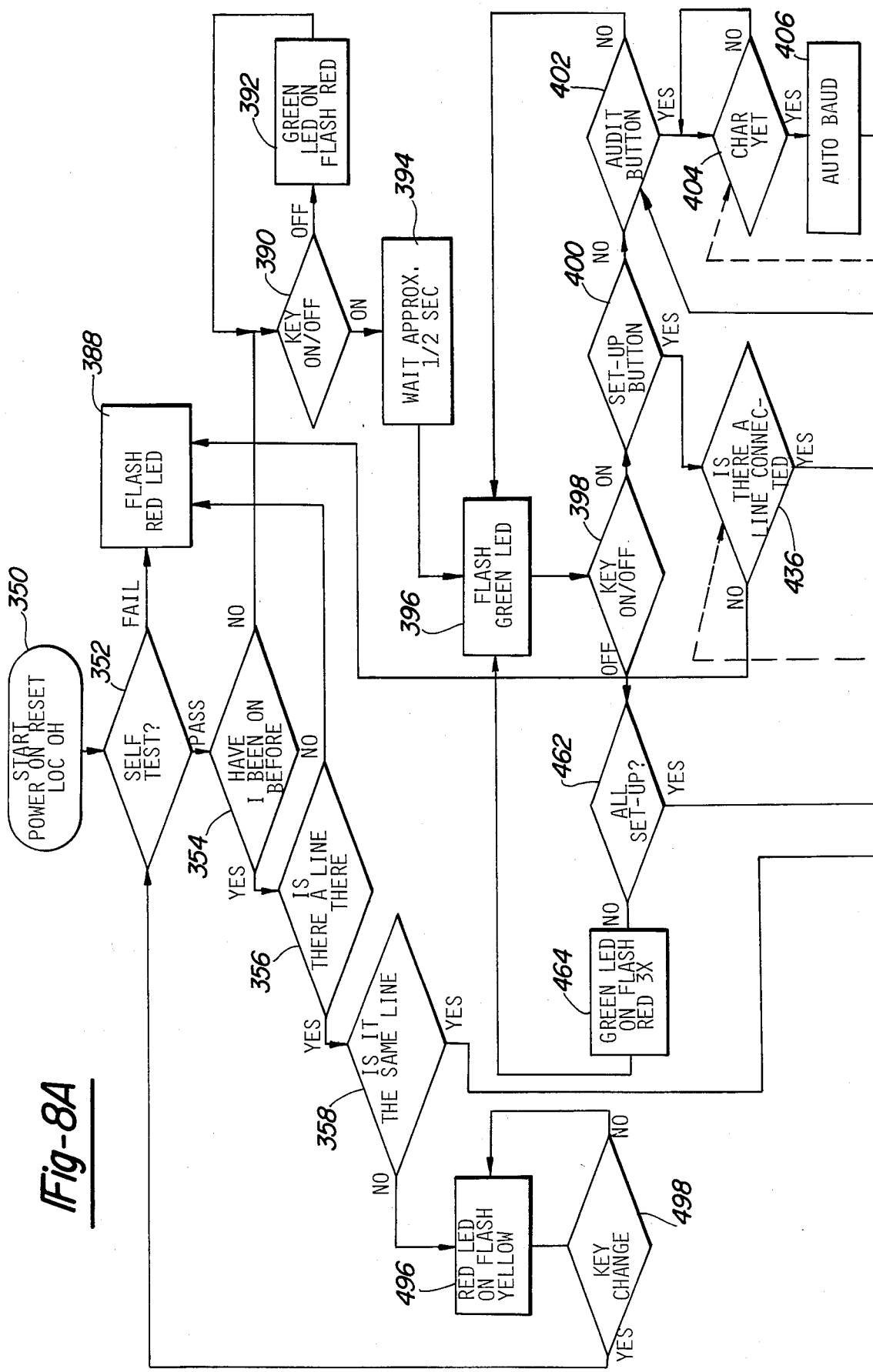
FIGS. 8A, 8B and 8C are a flow chart showing the steps practiced by the method of the present invention.
Figure 8B:
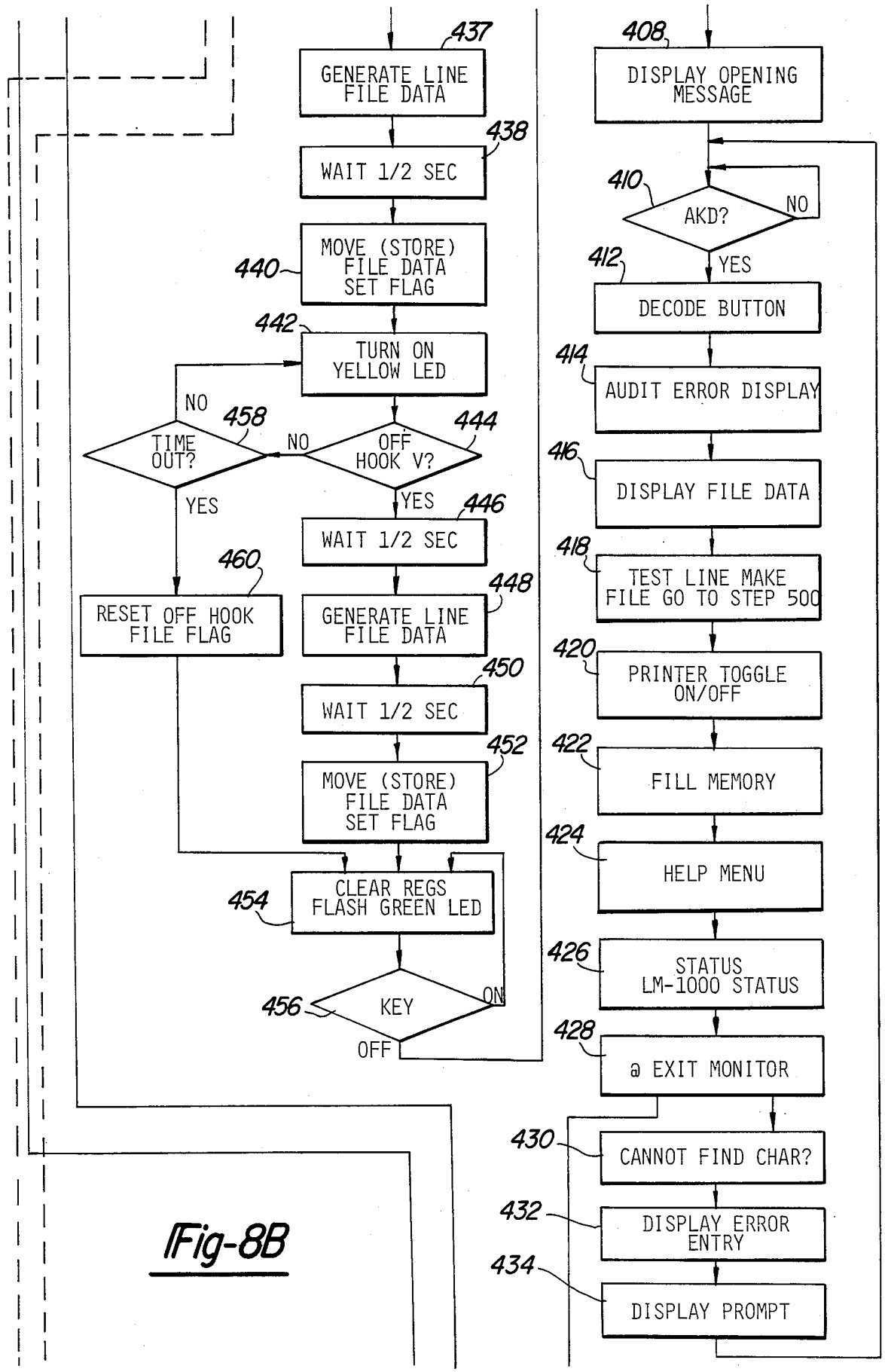
Figure 8C:
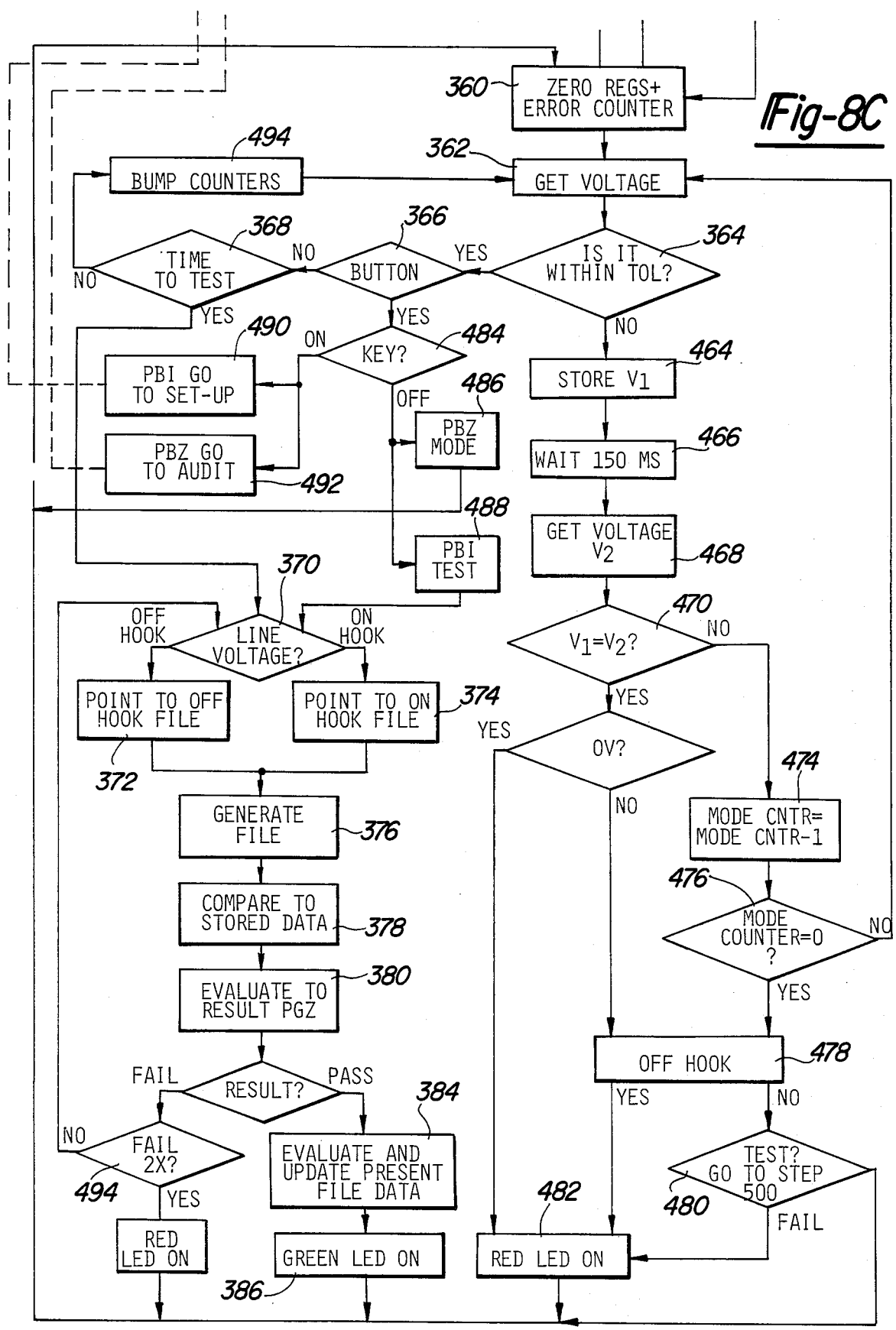

How the circuit components just described are operated in various manners by the program stored in the microprocessor is shown by the flow charts in FIGS. 8A, 8B and 8C.

No matter what operation is to be undertaken by the device, the power supply 208 must first be plugged in, and power supplied to the system. The microprocessor, under the control of a computer program, first causes the system to go to a power on reset condition (Step 350). The unit will then perform a self test (Step 352). During the self test an error message, which would be the self test error message E1 is generated when any one of the following conditions occur: (a), the ROM 210 fails to generate the correct sum value, (b) the RAM 215 fails to read or write correctly, (c) the clock 217 is unable to read, (d) the A to D converter 207 or the D to A converter 204 does not respond. If any of these conditions are present, the system will fail the self test, and the appropriate indicator light 201 will flash (Step 388).

If the self test is passed, the computer program will ask the system if it has ever been on before. In other words has it ever been set up before (Step 354). If the system has been set up before, the microprocessor will ask if there is a telephone line connected to the system (Step 356). If there is, a check of the voltage of the line will made by the system to determine if it is the same system or if, for example, somebody moved the unit, and although there is a line connected, it is a different line. If the line is different, the appropriate indicating means 201 will flash (Step 496) and the system will ask whether there has been any change in the position of the secure/non-secure key 250 (Step 498). If there has been no key change position, the system will go back to Step 496 and the appropriate indicator means will be illuminated. If the operator changes the position of the key however, the system will return to Step 352 and perform another self test (Step 354).

Since we have presumed the operator has changed the key position (Step 498) of the secure/non-secure key 250, this clears the RAM memory so there is no previous history of readings, so that when the question is asked has the system been on before (Step 354) the answer is then indicated as "no", and the system proceeds to Step 390 where it asks is the key on or off. If the key has been moved from on to off, appropriate indicator means 201 are illuminated, and the system will continue to move through steps 390 and 392 until the key is changed to the other position. If the key is in the "on" position, the system proceeds to a 500 millisecond wait (Step 394) and then flashes the green indicator light 101A (Step 396).

Since the key is "on" at Step 398, the system will ask if the test/set up button 202A has been depressed. If the button has not been depressed, which can only be done effectively if the secure/non-secure key is in the "on" position, the system will then ask (Step 402) if the mode/audit button 202B has been pushed. Again, the mode/audit button is only effective if the key is "on". If this button has not been pushed, the system will continue to move through Steps 396, 398, 400 and 402 until either the test/set up button 202A or the mode/audit button 202B are depressed. Assuming the test/set up button 202A has now been depressed, the system will ask (Step 436) if there is a phone line connected. If the system is attempted to be set up with no phone line connected, the red indicator 201C will flash continuously until some action is taken by the operator.

If there is a phone line connected, the system will proceed to generate line file data (Step 437). As shown in FIG. 11, the file that will be generated will contain the reactance values of the phone line over a predetermined period of time, as well as the line current and line voltage values.

It should be understood that, although not separately shown, since line current can be obtained from line voltage simply by applying the line voltage over a known resistance, each time a line voltage is taken and/or compared, a line current reading is also taken and compared. The system will then wait one half second (Step 438), store the values taken over the past half second (Step 440), then turn on the yellow indicator light 201B (Step 442). The system will then ask if the voltage read is the off hook voltage (Step 444). If the voltage is the off hook voltage, the computer program in the microprocessor will cause a half second wait (Step 446) and then another line file data will be generated (Step 448). Another half second wait (Step 450) is then programmed in, after which the system will store the file and raise the data set flag (Step 452), at which time (Step 454) the registers will be cleared and the green indicator light 201A will flash signalling a successful set up.

However, at Step 444, if the off hook voltage was not being read, the system would ask itself (Step 458) whether it was time for time out. If the answer was no, the system would move through the Steps 442, 444 and 458 continuously until the system was ready for time out at which time the system (Step 460) would reset the off hook file flag, clear the registers, and illuminate the green indicator light 201A in Step 454. This would indicate that the system was still set up from a previous time.

As can be seen from Step 456, if the key was on, the system would continue to flash the green indicator light until the key was turned to the off position. This is for security purposes so someone would not go off and leave the key in the system leaving it open to be set up by another party. Once the key is turned off, the system returns back to Step 402 to ask if one wants to audit the system. If one doesn't want to audit the system, it returns back to Step 396 where the green indicator light 201A would be flashing. This would continue until the key was turned off and the system was ready to monitor the line continuously.

Figure 9:
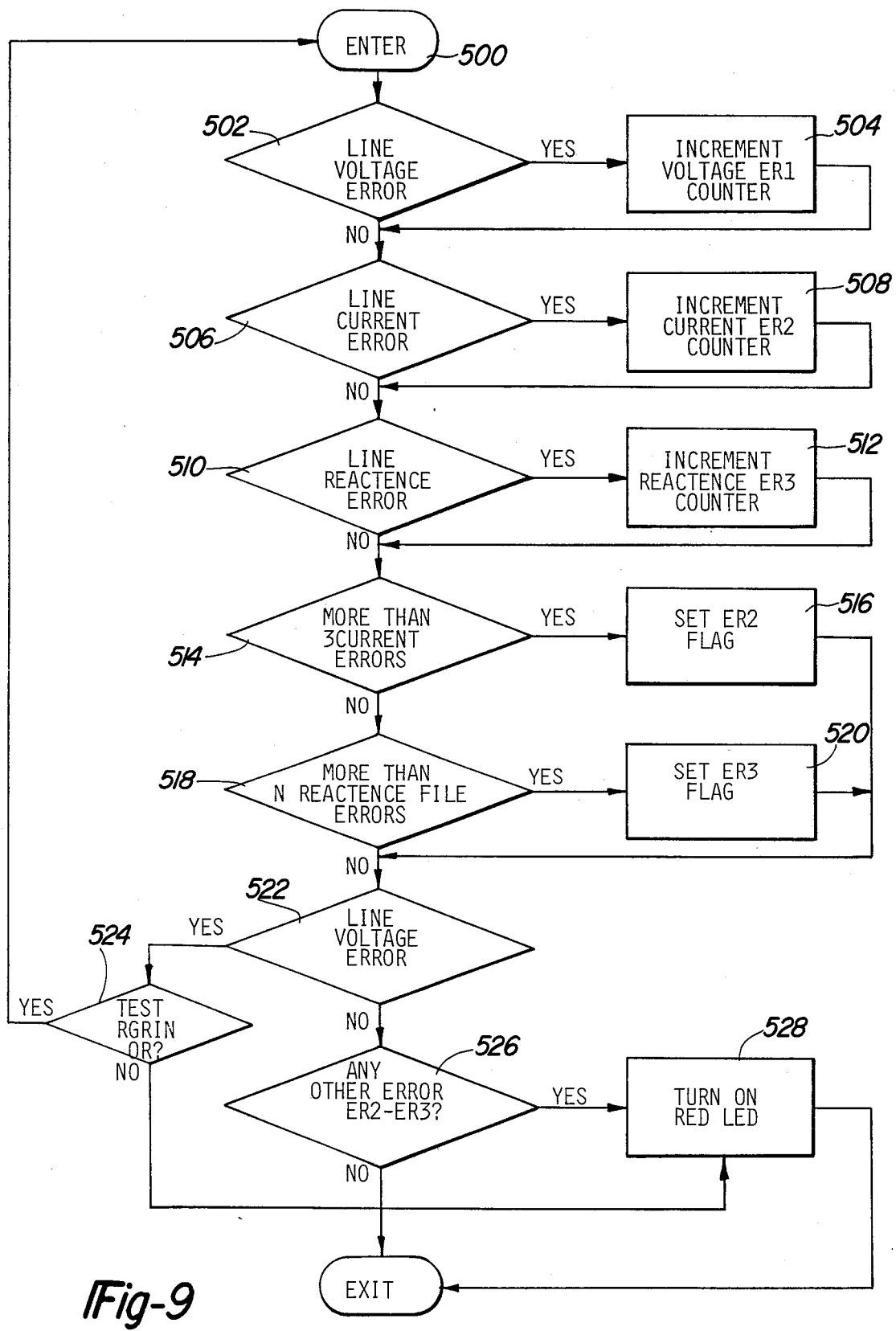
FIG. 9 is a flow chart showing a particular series of steps used in the test sequence utilized in the flow chart shown in FIGS. 8A-C.

If, however, one did want to audit the system, the microprocessor would proceed to Step 402. The system would then ask if the mode/audit button 202B was pushed. In this case, assuming it is, and assuming the computer terminal 209 were plugged in to audit, the system would ask if any character has been pushed on the computer terminal keyboard yet. If not, the system would simply continue to look until a character was pressed, at which the time auto baud function would be performed to match the systems output to the computers input. To do this, the microprocessor 200 times the first bit of the A.S.C.I.I. input (which is a start bit) and arrived at a value which it uses to output at the equivalent time, to establish communication with whatever computer terminal 209 is connected to the system. After the auto baud function (Step 406) has taken place, the program in the microprocessor 200 will cause the computer terminal 209 which is attached to the system to display an opening message (Step 408). Then at Step 410 the system is asking if another key has been depressed. Through the mop decode circuitry 211 it can look to see if various characters have been depressed. At Step 414, if "A" had been depressed the computer will be caused to display an audit error display. At Step 416 if the character "D" has been depressed, the computer will then display the file data. If the "T" character has been depressed, the system will exit to Step 500 (see FIG. 9) and perform a test of the telephone line. FIG. 9 will be described in more detail hereinafter.

If the character "P" was depressed Step 420 the printer would be activated, while if "F" was depressed the computer would be enabled to receive data for its memory.

If the character "H" was depressed the help menu would be displayed, while if the character "S" was depressed the status of the system would be displayed. If the "@" button was depressed this would be the symbol for the exit monitor so that the computer would attempt to exit from program. If it could not find any characters (Step 430) it would display an error message (Step 432) and a display prompt (step 434) and return to Step 410. If the system was properly exiting it would then proceed to Step 360.

If the system is ready to resume testing the telephone line, it will proceed to Step 360 where the Zero counters and error counters will be set at zero. The system will then get the voltage (Step 362) and ask if it is within tolerance. If the voltage is not within tolerance, it will store an initial voltage reading (Step 464) wait 150 milliseconds (Step 466) get a second voltage (Step 468) and compare the first voltage to the second voltage to see if they are equal (Step 470). If they are equal, the system then asks if they are both zero. If they are, the system has failed and the red indicator light 201C is turned on (Step 482). If it is not a zero voltage, the system asks is the receiver off the hook. If it is, the operator is so informed by the red indicator light 201C being illuminated. If the voltages are not equal to zero, and the telephone receiver is not off the hook, another test is performed as a double check on the first test. If this test is passed, the system goes back to Step 360 to try another test. If, however, both tests have failed, the system proceeds to Step 482 and the red indicator light 201C is turned on.

Going back to Step 364, if the voltage was within tolerance the system will proceed to Step 366 and the question will be asked "is any button pushed". If the one of the buttons is pushed, the system will ask if the key is on or off. If the key is off, the system proceeds to Step 486 and asks if the mode/audit push button 202B is pushed down. If it is the system simply cycles to (Step 360) and further tests will be performed repeatedly to monitor the telephone lines. However, if the test/set up push button 202A is pushed down (Step 488) the system proceeds to Step 370 where a check of the line voltage is made. If the line voltage equals the on hook voltage the stack pointer is moved to the on hook file (Step 374) at which time the system proceeds to generate a file of the off hook voltage. If the line voltage was equal to the off hook voltage the stack pointer would be moved to the off hook file (Step 372) at which time the file being generated at (Step 376) would be an off hook file. At any rate, the file is generated at Step 376.

At Step 378 this file is compared to the previously generated file, and at Step 380 an evaluation is performed to determine whether the generated file is equal to the new file. If the new file is equal to the old file, the result is favorable, and the test has been passed, thus at Step 384 the old data will be replaced with the new data, the green indicator light (Step 386) will be illuminated and the system will move to Step 360 to begin another check of the line voltage and will repeatedly do this as long as the voltages are within tolerance.

However if the new data was not equal to the old data, the result would be a failure and the system will ask at Step 494 if the test has been failed two times. If it has not, the system will move to Step 370, making another test, and begin to check the result. If the test is favorable this time the system will again pass through Steps 384 and 386 and back to Step 360. However if the test has been failed two times, the system will illuminate the red indicator light 201C alerting the operator to the failure.

However, if the key was "on" in Step 484, the system will then determine which push button was depressed. If the test/set up push button 202A was depressed the system will move to Step 436 to then start the set up procedure again. If the mode/audit push button 202B. were depressed, the system instead would move to Step 404 and again the audit routine would be tried.

Returning for a moment to Step 470 in the monitoring cycle, if the line voltage during the first test 464 was not equal to the line voltage during the second test 468, the system would proceed to Step 474 and decriment the mode counter by one. The system would then ask if the mode counter was equal to zero. If it was not it would proceed to Step 362 and begin another cycle. If the mode counter was equal to zero, then the phone was not off the hook (Step 478) the system would proceed to a detailed test 480 as detailed in FIG. 9.

When this test is entered (Step 500) the system would determine whether there was a line voltage error, the line voltage being simply a measurement of the telephone line, in comparison to past data. If there was a line voltage error the system (Step 504) would increment the voltage error counter by one (Step 504) and return to the main sub routine. The system would then ask (Step 506) if there is a line current error. The line current is computed using the formula I line=V line/R line (1000). If this was computed and not found to be correct for the particular telephone line, the system would increment the current error counter in Step 508 and return to the system. If there was no line current error the system would proceed directly to Step 510 to see if the line reactance has changed. If the line reactance has changed, the reactance error counter would be incremented in Step 512, and then the program would return to the main sub routine. If there was no line reactance error, the program would proceed directly to Step 514 and ask if there were more than three current errors at the time. If there were, the E2 flag would be set. Normally this happens when some or all of the phone line data in the RAM is lost after a power failure. In this case the set up unit must be reset up, and the operator would return to the set up procedure.

If there were no more than three current errors the system would proceed to Step 518 where it would be determined whether or not there are more than N reactance file errors. The value N is a value calculated by the processor in processor time. It is the amount of time periods that it takes the phone line to go from 25% to 75% of its voltage.

It has been determined that during the testing of a normal telephone line up to N reactance errors can occur without there being a "bug" on the line.

Figure 10:
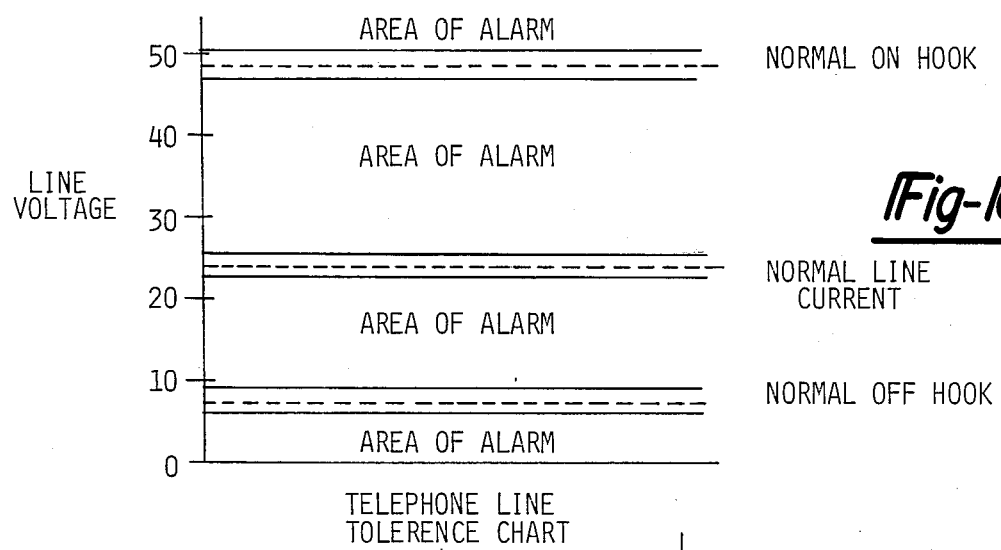
FIG. 10 is a chart showing normal on hook, off hook, and line current voltages for a typical telephone line.

If there were more than N reactance file errors the E3 flag would be set in Step 520. Error E3 is generated during a line test when line voltage changes from on hook voltage to off hook voltage, the reactive capacitance changes by more than ten percent, or there is a change in line voltage or line current which exceeds the parameters set forth in FIG. 10.

If there are more than 11 reactance file errors the E3 flag is set as in Step 520. If there are not more than N file errors, or after the E3 flag is set, the sub routine returns to Step 522 and asks if there is a line voltage error.

A line voltage error is generated when the line voltage leaves its normal area and enters an a "area of alarm" (FIG. 10) and stays there any longer than 550 milliseconds, or the line voltage remains the exact same value in the "area of alarm" for more than a predetermined time. If there are no line voltage errors, and there are no other errors (Step 526) this sub routine will be exited from and the system will return either to Step 482 or 360.

If there are errors of the E2 or E3 type, the red indicator light 201C will be turned on (Step 528), or if there is simply a line voltage error the system will not check for any other errors and will try testing again (Step 524) as long as E2 or E3 errors are not present. If the test is passed successfully this time, the sub routine will exit. If it is not the system will illuminate the red indicator light 201C. A computer program which operates the system in this modification of my invention follows immediately below, followed by a parts list which corresponds to FIGS. 7A-B.

```
B>
B>TYPE MOD.HEX
:10000000F30E1E3E0021003D77BE200D3D20F9235A
:10001000D20F531FF3FC300013E00320640320 79C
:100020004032054057 01FF4F0B78B120FB7A2F1863
:01003000F0DF
:03003800C34C0AAC
:03006600C3640070
:10010000 31FF3FCD190ACD6004FE00C21901CDD9DF
:1001100004FE00C21900C3AE013A00C0E604282A5A
:100120003E05CD2E0A01FF2F3A00C0E60428 1B0B26
:100130007 8B120F43E01CD2E0A01FF233A00C0E63B
:1001400004280 7 0B78B120F418D6CDBD083E01CDA8
:100150002E0A3A00C0E604203501FF7F3A00C0E6CF
:100160003FE02CC7003FE01CA53060B78B120ECEB
:100170003E00CD2E0A01FF7F3A00C0E603FE02CC2E
:1001800070 03FE01CA53060B78B120EC18BFCD6096
```

```
:10019000004FE00CAE3010603E05CD2E0ACDD10888
:1001A0003E01CD2E0ACDD1080520EDC34A01CDCFA9
:1001B00002FE00CAE3013A00C0E60432403F3E03BB
:1001C000CD2E0ACDD1083A00C0E604473A403FB8E8
:1001D000C2DD013E01CD2E0ACDD10818E1CD850446
:1001E000C3000131FF3FCD2702473A00C0E604FEBD
:1001F00000200C78FE022814FE01CA190218E47SC7
:10020000FE02CA9A04FE01CA360618D73E00CD2E59
:10021000ACDC408CDCF0218CA3E00CD2E0ACDC4E7
:1002200008CD2702C3E9011100003E003200603210
:10023000000803E3232003F3E5A32023F3E013207DA
:1002400040 3A00C0E603FE03204F3A008047CDA6A7
:1002500002FE00C26E021B7BB220E63A003F3DC2A6
:100260006802CDCF02C3270232003FC341023A02E7
:100270003F3D281D32023FCDBD083A00C0E603FED7
:100280000320163A0080CDA602FE00C26E02C327EC
:10029000023E01320540C3270247CD3F0A3A00C063
:1002A000E603B82082C9C54F21003346CD3004FE95
:1002B000000280C79210 03446CD4604FE0020 43E7F
:1002C00000 00C1C93EFFC1C9D51ECF1D20FDD1C9E562
:1002D000D5C532008000003A0080FE00F24303CD15
:1002E0003F0ACD5D033E01320740320640CDC408CF
:1002F0003E003206 40CDD903110033CD4B053A3ACA
:100300003FFE00CA430347CDC408CDC408CDC408 8E
:10031000CDD903110033CD4B053A3A3FFE00CA4315
:100320003B8CA4D03CDC408CDC408CDC408CDD987
:10033000031100 33CD4B053A3A3FFE00CA4303B8E0
:10034000CA540 3110033CDCE043E00180C3E0F32C8
:100350 00054018053EFF320540C1D1E1C9C5E52180
:10036000103F46234E0378B12803712B70E1C1C9B9
:10037000CDD904FE00C21900CDC408CDC4083E0189
:10038000CD2E0ACDD903110033CDCE043E03CD2EA0
:100390 00A0EFF320080003A0080FE00F2BC03CD5E
:1003A000C408CDC408CDC408CDC4080D20E53EFF67
:1003B0003200363E01CD2E0ACD7704C9CDC408CD1A
:1003C000D9031100 34CDCE043E003200363E01CDBB
:1003D0002E0ACD7704CDFD05C9E5D5C5CD28053E4E
:1003E000 00320060CD3F0A110030320800 03A003B
:1003F000 08012132126 047EFE00CA0A432006 0CD58
:100400003F0A3A008012231318EC3200 60CDC40872
:100410001301280021008 03EFF32006 000EDB03E55
:100420000003200 60C1D1E1C91F4F6F8FAFCFEF0025
:10043000D5160805050 5B82 0E .520F93EFF5E
:10044000D1C93E00D1C9D5161005050 5050505051C
:100450005B828064152 0F93EFFD1C93E00D1C9CE
:100460000060821703D1192041ABE2008231305 20AE
:10047000F73E00C93EFFC93E8006 0821703D770F58
:100480002305 20FAC93E021703D0608 772305 2088
:10049000FBC980402010 08040201CD7003 3E01CD4D
:1004A0002E0ACDC4083A00C0E604FE00280A3E0029
:1004B000CD2E0ACDC40818E5C3E3013A3A3FFE0049
:1004C00020063E01CD2E0AC93E04CD2E0AC9C52103
:1004D0000003001400 0EDB0C1C90EFF32008000CDF8
:1004E0003F0A3A0080FE00FAF0040D20F23EFFC9F8
```

```
:1004F0003EDF320060CD3F0A0EFF3A0080FE00F280
:100500000D050D20F53E003200603EFFC93E003271
:100510000060C9C5477EFE002806B828072318F5E5
:100520003EFFC1C93E00C1C921003000E403E0077E8
:10053000230D20F9C906053E07CD2E0ACDC4083E7D
:1005400000CD2E0ACDC40805020EDC9E5C53E003218
:100550003A3F32323F322D3F32303F210030461A8F
:10056000CD3004FE00204513230E07461ACD30047B
:10057000FE00204223130D20F20E20461ACD300437
:10058000FE00203B23130D20F23A323FD603FA99A6
:1005900000053A3A3FF602323A3F3A303FD609FAA9D5
:1005A00000053A3A3FF604323A3FC1E1C93A3A3FF6DA
:1005B0000001323A3F18B13A323F3C32323F18B53A35
:1005C000303F3C32303F18BCE53A3A3FE60F47CB6C
:1005D00008300621120BCDAC08CB08300621280BC1
:1005E000CDAC08CB08300E213D0BCDAC0821080C5A
:1005F000CDAC08E1C921540BCDAC08E1C9E5C5215A
:10060000003B0E0E3A0033D607773CFE0028042349
:100610000D20F6230E1E3A0036FE0028063E1E0E62
:100620002818053A0034C605D60F773C230D20FA6A
:100630003E0077C1E1C93E02CD2E0ACDB6083A0090
:10064000C0E603FE01280CFE02CA9A043E00CD2E2D
:10065000A18E3CDF708CD3F0A216B0CCDAC08CDCD
:10066000C408CDA108FE0D28F9FE0A28F5FE21CA0E
:100670005306FE53CAAB06FE50CAB006FE41CAB5C9
:1006800006FE48CABA06FE462835FE442836FE470E
:100690002637FE542838FE4D2839FE40CA0012173
:1006A000440DCDAC08CDEA08C36206CD200718285A
:1006B000CD400718 23CD040718 1ECD470718 19CDC4
:1006C0004E0 71814CD830 7180FCDCC0 7180ACDE4B8
:1006D000061805CD27021800214 40DCDAC08CDEA3F
:1006E00008C36206CDD9033A0030FE00F2FA0611C3
:1006F00000033CD4B05CDC8 05180 9110 034CD4B058D
:10070000CDC805C921210CCDAC083A3A3FCDD6075A
:10071000CDEA0821330CCDAC083A003FCDD607C94D
:10072000215F0ACDAC08CDEA0821740ACDAC0832AD
:10073000080003A0080CDEA0821870BCDAC08C9C3
:10074000217E3F7E2F77C921B40CCDAC08C9216D25
:10075000BCDAC08CD0908CDDC087ECDD607CDDCAD
:1007600008CDA10847FE202814FE0D2815CDEE0760
:1007700047CDA108FE0D2808FE2028007023187B9
:1007800070C9C921B60BCDAC08CDA108FE31280F28
:10079000FE322810FE332811 21840ACDAC08C9117D
:1007A000003018011003318031100 34CDEA082175
:1007B000440CCDAC08CDA108FE5920 73E5532 7E31
:1007C0003F18053E00327E3FCD5308C9215A0CCD5B
:1007D000AC08CD0908E9C5470F0F0FCD1208CDA2
:1007E0001D097SCD1208CD1D09C1C9CDA108C5CDFF
:1007F00032080707070747CDA108CD3208B0C1C9A5
:10080000 7CCDD6077DCDD607C9CDEB0767CDEB07ED
:1008100006FC9E521220 8E60F3C3D28032318FA7E24
:10082000 0E1C93031323334353637383941424344 07
:100830004546E5C50E1021220 8BE2810230D20F9DB
:1008400021840ACDAC08CDEA08C362060D3E0F91A3
:10085000C1E1C9CDEA08219E0ACDAC08CDDC081A59
:10086000CDD607CDEA0821AF0A13CDAC080 6071A8A
:10087000CDDC08CDD6 0713 05 20F5CDEA0821EC0A1A
```

```
:10088000CDAC08CDA108CDEA0806040E081ACDD6D5
:1008900073E20CD1D09130D20F3CDEA080520EBFE
:1008A000C9CD6D09FE028F9CD1D09C97EFE7AC8A3
:1008B000CD1D092318F6F5C501FF4F180CF5C5012C
:1008C000FFCF1805F5C501FFFF0B78B120FBC1F183
:1008D000C9C501FF3F0B78B120FBC1C9F53E20CD52
:1008E0001D09CD1D09CD1D09F1C9F53E0DCD1D090F
:1008F0003E0ACD1D09F1C92100C07EE68020FB0023
:10090000000000000000000000E002100C00C7EE68008
:1009100028FA79217703F770FE67F2377C9E5D5C59F
:10092000472F0E0821004036010D52090D280477CB
:10093000F18F63E00770E0ACD52090D20FA3A7EC6
:100940003FFE00280878CD9F09C1D1E1C978C1D107
:10095000E1C9E521703F5E0000001D20FAE1C9E514
:1009600021703F235E0000001D20FAE1C9E5D5C5D6
:100970002100C001FF017EE68028070B78B128190D
:1009800018F40E07CD5F093E0047CD52097EE68080
:10099000B00F470D20F47818023E00C1D1E1C9E53F
:1009A000C5CDEA09470E0821014036012FCDDD09EA
:1009B0000D280477D0F18F63E00770E0ACDD090DDD
:1009C00020FA78FE0A2003CDCD09C1E1C9CDC408C3
:1009D000CDC408CDC408CDC408CDC408C9E5217074
:1009E0003F5E0000001D20FAE1C901001F0D20FD3F
:1009F0000520FAC9D557CB3FCB3BB8280CFA0F0AD7
:100A0000599091CA090AF2140A2E007A4BD1C9589A
:100A1000477B18EC2E557AD1C93E00320060327EF9
:100A20003F21103F772377232003FCD2E0AC9C5E51D
:100A3000060321074077 2BCB3F0520F9E1C9F51B
:100A4000C50150030B79B020FBC1F1C9F33A453F12
:100A50003C32453FCDCD093E00CD2E0AFBED4D0D7C
:100A6000535441545553204F46204C4D2031303083
:100A7000300D0A7A0D20412F44203D7A414C4956D1
:100A800045207E7A0D0A202A20494E434F52524576
:100A9000435420454E545259202A200D0A7A0D4CB9
:100AA000494E4520564F4C54414745203D207A0D34
:100AB0000A4C494E452043555252454E4520504C05
:100AC0004F543A200D0A3454203120202020323
:100AD000202020203320202020342020203520DA
:100AE000202036202020370D0A7A50524553EE
:100AF000532041E59204B4552204645F20524504
:100B00004143544E43452046494C4520444154B9
:100B1000417A4C494E4520564F4C544147452020800
:100B200045552F520D0A7A4C494E4520435552278
:100B30005245444E204552524F520D0A7AE454169
:100B40004354454E43452046494C4520435524F5B
:100B5000520D0A7A0D544553542050415353204CA2
:100B6000494E4520494F524D414C0D0A7AD46493
:100B70004C4C204D454D4F52592041542041444446
:100B8000524553533D7A0D0A4C4D2D3130303033
:100B90002043484B34B53204F4B0D0A414C4C20B4
:100BA00043495243555453204F5045524541494FA5
:100BB0004E414C0D0A7A0D44444953504C415920572F
:100BC00048494348204249434C45203F0D0A283129D1
:100BD0002043555252454E4420464946C450D0A2853
:100BE0003229204F4E20484F4F4B2046494C450D4F
:100BF0000A28333229204F4664204F4F4B2046496C
```

```
:100C00004C450D0A3F3E207A414C4C204F544845FC
:100C10005220544553453205041535344440D0AD8
:100C20007A0D4552524F5220534414542052454759
:100C3000203D7A0D4D4F444520534415420524598
:100C400047203D7A5052494E5420524553554C54FA
:100C50005320285920D4E29203F7A0D474F204154CB
:100C6000204144445245535320203D7A0D202020FA
:100C70002A2A2A205345434F4D20474544455552AE
:100C8000414C20202A2A2A200D0A20202A2A2A2004
:100C900020204D4F4E49544F5220564552203112E60
:100CA000302020202A2A2A0D0A205441534B203F6D
:100CB0003F203E7A0D202A2020204C4D313030204B8F4
:100CC000454C50205441424C45202020A0D0A0A10
:100CD00020284429495350 4C4159202E2E2E2E2E87
:100CE0002E28462949494C4C204D4544D0D0A202848B8
:100CF00029454C50202E2E2E2E2E2E2E2E2E2847BD
:100D0000294F20202041 4D454D0D0A20285429455338
:100D10005420 2E2E2E2E2E2E2E2E2E284D294F4490
:100D2000452020202020 0D0A202850295249 4E5445454
:100D300052202E2E2E2E2E2E2E284129554449542037
:0FD400002020200D0A205441534B203F3F203E7A84
:00000001FF
R>
```

PARTS LIST

| | | | |
|---|---|---|---|
| 1. | U1 | Z-80 CPU | ZILOG |
| 2. | U2 | MM54167 CLOCK | NATIONAL SEMI |
| 3. | U3 | HM6264LP-10 RAM | HITACHI |
| 4. | U4 | 2764-3 ROM | AMD |
| 5. | U5 | 74LS04 | NATIONAL |
| 6. | U6 | 74L138 | NATIONAL |
| 7. | U7 | AD7574JN A/D | ANALOG DEVICES |
| 8. | U8 | AD558JN D/A | ANALOG DEVICES |
| 9. | U9 | 74LS08 | NATIONAL |
| 10. | U10 | LM747CN OP-AMD | NATIONAL |
| 11. | U11 | 74LS244 | NATIONAL |
| 12. | U12 | NE591 OUTPUT | SIGNETICS |
| 13. | U13 | LM311 COMP | NATIONAL |
| 14. | U14 | LM747CN OP-AMP | NATIONAL |
| 15. | R1 | 470 OHM ¼W | 5% |
| 16. | R2 | 470 OHM ¼W | 5% |
| 17. | R3 | 470 OHM ¼W | 5% |
| 18. | R4 | 330 OHM ¼W | 5% |
| 19. | R5 | 330 OHM ¼W | 5% |
| 20. | R6 | 3.3K OHM ¼W | 5% |
| 21. | R7 | 3.3K OHM ¼W | 5% |
| 22. | R8 | 1.0K OHM ¼W | 5% |
| 23. | R9 | 1.0K OHM ¼W | 5% |
| 24. | R10 | 47K OHM ¼W | 5% |
| 25. | R11 | 3.3K OHM ¼W | 5% |
| 26. | R12 | 3.3K OHM ¼W | 5% |
| 27. | R13 | 3.3K OHM ¼W | 5% |
| 28. | R14 | 3.3K OHM ¼W | 5% |
| 29. | R15 | 150K OHM ¼W | 1% |
| 30. | R16 | 470 OHM ¼W | 1% |
| 31. | R17 | 1.75K OHM ¼W | 1% |
| 32. | R18 | 20K OHM ¼W | 1% |
| 33. | R19 | 1.0K OHM ¼W | 1% |
| 34. | R20 | 10.0K OHM ¼W | 1% |
| 35. | R21 | 2.0M OHM ¼W | 1% |
| 36. | R22 | 1.0K OHM ¼W | 1% |
| 37. | R23 | 100.0K OHM ¼W | 1% |
| 38. | R24 | 50K 10 TURN POT | 1% |
| 39. | R25 | 90.0K OHM ¼W | 1% |
| 40. | R26 | 20K 10 TURN POT | 1% |
| 41. | R27 | 10.0K OHM ¼W | 1% |
| 42. | R28 | 10.0K OHM ¼W | 1% |
| 43. | R29 | 1.7K OHM ¼W | 1% |
| 44. | R30 | 8.3K OHM ¼W | 1% |

PARTS LIST -continued

| | | | | |
|---|---|---|---|---|
| 45. | R31 | 1.0K OHM | ¼W | 1% |
| 46. | R32 | 470 OHM | ¼W | 1% |
| 47. | R33 | 12.0K OHM | ¼W | 1% |
| 48. | R34 | 82.0 OHM | ¼W | 1% |
| 49. | R35 | 100K OHM | ¼W | 1% |
| 50. | R36 | 1.0K OHM | ¼W | 1% |
| 51. | R37 | 50K 10 TURN POT | | 1% |
| 52. | R38 | 10.0K OHM | ¼W | 1% |
| 53. | R39 | 10K 10 TURN POT | | 1% |
| 54. | R40 | 8.20HM | ¼W | 1% |
| 55. | R41 | 43.OHM | ¼W | 1% |
| 56. | R42 | 100.0 OHM | ¼W | 1% |
| 57. | R43 | 200.0K OHM | ¼W | 1% |
| 58. | R44 | 2.0K OHM | ¼W | 1% |
| 59. | R45 | 470 OHM | ¼W | 5% |
| 60. | R46 | 270 OHM | ¼W | 5% |
| 61. | R47 | 10K OHM | ¼W | 5% |
| 62. | C1 | 20 PF | 50V | CIREMAC |
| 63. | C2 | 20 PF | 50V | CIREMAC |
| 64. | C3 | .01 UF | 25V | CIREMAC |
| 65. | C4 | .002 UF | 25V | CIREMAC |
| 66. | C5 | .01 UF | 25V | CIREMAC |
| 67. | C6-C13 | .01 UF | 25V | CIREMAC |
| 68. | C19 | 100 PF | 50V | MICA |
| 69. | C20 | 10 PF | 50V | MICA |
| 70. | C23 | 100 PF | 50V | MICA |
| 71. | C21, C22, C24, C25 | 100 PF | 50V | MICA |
| 72. | D1-D5 | 1N914A | 50 PIV | DIODES |
| 73. | D6 | 1N4001 | 100 PIV | DIODE |
| 74. | BRI | DIODE BRIDGE | 100 PIV | |
| 75. | Q1 | TIP30C | | TRANSISTOR |
| 76. | LEDI-3 | MM530 LED'S | | |
| 77. | C1-3 | RJ-11 | | TYPE CONNECTORS |
| 78. | P1-2 | SWITCHCRAFT SW11A8B SWITCHES | | |
| 79. | X1 | 4.0 MHZ | | CRYSTAL |
| 80. | X2 | 38.768 KHZ | | CRYSTAL |
| 81. | | P.C. BOARD | | |
| 82. | | EXTERNAL POWER TRANSFORMER | | |
| 83. | | CASE | | |
| 84. | S1 | KEYSWITCH | | |

By constantly refining and updating my invention I have developed a novel wire tap detection device which detects the mere attachment of such device to the telephone line.

I claim:

1. A device for detecting the presence of an intruder listening device on a telephone or data line including:
   (a) means to connect said device to a telephone line,
   (b) means for measuring the values of a plurality of electrical characteristics of said telephone or data line connected to said means to connect,
   (c) means for passively generating a signal on the telephone or data line connected to said means to connect by simulating an on-hook, to off-hook condition, and back,
   (d) means to control connected to said means to connect, said means for generating, and said means for measuring.

2. The device defined in claim 1, and including:
   (a) means to select connected to said means to control,
   (b) means to display connected to said means to control; and
   (c) means to audit connected to said means to select.

3. The device defined in claim 2, wherein said means to select includes:
   (a) a mode/audit push button; and
   (b) a test/set up push button.

4. The device defined in claim 3, wherein said means to display include a plurality of indicator lights.

5. The device defined in claim 4, wherein said plurality of indicator lights include a red LED, a yellow LED, and a green LED.

6. The device defined in claim 3, wherein said means to audit includes a computer terminal having display and/or printing capabilities.

7. The device defined in claim 6, wherein said means for measuring include an analog to digital converter interposed between said means to connect and said means to control.

8. The device defined in claim 7, wherein said means for generating a signal include a digital to analog converter interposed between said means to control and said means to connect.

9. The device defined in claim 8, wherein said means to control include a microprocessor under the operation of an appropriate computer program.

10. The device defined in claim 9, wherein said microprocessor includes a central processing unit.

11. The device defined in claim 10, and including:
    (a) a map decode circuit connected to said central processing unit,
    (b) a four megahertz clock connected to said microprocessing unit,
    (c) a read only memory connected to said microprocessor,
    (d) a random access memory connected to said central processing unit,
    (e) a real time clock connected to said central processing unit.

12. The device defined in claim 11, and including a battery charge circuit connected to said random access memory and said real time clock.

13. The device defined in claim 12, and including a 38.6 kilohertz clock connected to said real time clock.

14. The device defined in claim 13, wherein said means to display include:
    (a) an output buffer connected to said central processing unit through a control bus, an address bus, and a data bus, and
    (b) a plurality of indicator lights connected to said output buffer.

15. The device defined in claim 14, wherein said means to select include:
    (a) an input buffer connected to said central processing unit through a control, an address, and a data bus and
    (b) a mode/audit push button connected to said input buffer; and
    (c) a test/set up push button connected to said input buffer.

16. The device defined in claim 15, wherein said means to connect comprises a telephone interface.

17. The device defined in claim 16, wherein said telephone interface includes:
    (a) a comparator connected to said analog to digital converter,
    (b) an amplifier connected to said analog to digital converter,
    (c) a precision divider/isolator connected to said amplifier,
    (d) a precision current sink and a current sensing device connected to each other seriatim, and connected in parallel with said precision divider/isolator,
    (e) an error amplifier connected between said precision current sink and said current sensing device; and
    (f) a telephone set being connected to said precision current sink and current sensing device through a pair of transient line protectors.

18. A method of detecting an intruder listening device on a telephone line, said method including the steps of:
    (a) passively generating a predetermined wave form on the telephone line to be tested by simulating an on-hook, to off-hook condition, and back of said telephone line,
    (b) measuring the reaction of the telephone line to the signal,
    (c) comparing the measurement taken with predetermined limits, and
    (d) indicating when the results of said comparison vary from said predetermined limits by a predetermined amount.

19. The method as defined in claim 18, and including the additional steps of:
    (a) measuring the line voltage of the telephone line being tested,
    (b) measuring the line current of the telephone line being tested,
    (c) comparing the measured line current and line voltage with predetermined limits; and
    (d) indicating when the results of said comparison vary from said predetermined limits by a predetermined amount.

20. The method defined in claim 19, including the additional step of:
    (a) continuously performing the telephone line reaction test as long as the values obtained are within predetermined limits; and
    (b) storing each value obtained as the current value before a new test is performed.

21. The method defined in claim 20, and including the additional steps of:
 (a) reiteratively testing line current and line voltage as long as said values are within limits; and
 (b) using each new value obtained as the previous valve for comparison purposes.

22. The method defined in claim 21, and including the additional steps of:
 (a) halting said testing as soon as a tested value is outside limits,
 (b) indicating the out of limit condition by appropriate indicating means.

23. A method of detecting the presence of an intruder listening device on a telephone line, said method including the steps of:
 (a) making suitable connections to the telephone line to be tested to be able to measure line voltage, line current, and reactance,
 (b) reiteratively passively generating a wave form of a predetermined type on said telephone line,
 (c) measuring the reactance, line current and line voltage,
 (d) storing the values so measured,
 (e) comparing the measured values with previously measured values, and
 (f) indicating when the difference between a measured value and a previously measured value for any parameter is more than a predetermined amount.

24. A method of detecting an intruder listening device on a telephone line, said method including the steps of:
 (a) providing means capable of passively generating a wave form on a telephone line and measuring the line reactance, as well as measuring line voltage and line current,
 (b) connecting a telephone line to said means,
 (c) having said means determine whether or not it has been on before, and if it has,
 (d) having said means determine that a telephone line is connected to it,
 (e) determining that the line connected thereto is the same as the line previously connected,
 (f) obtaining an initial line voltage reading,
 (g) determining said initial line voltage reading is not in tolerance,
 (h) storing said first line voltage reading,
 (i) waiting a predetermined time,
 (j) obtaining a second line voltage reading,
 (k) storing said second line voltage reading,
 (l) determining if said first reading is equal to said second reading, and if said readings are equal, determining if said readings are equal to zero, and if said readings are not equal to zero,
 (m) determining if a telephone is off the hook, and if it is,
 (n) entering a test subroutine.

25. The method defined in claim 24, wherein said test subroutine is passed successfully, and the system then repeats the steps defined in claim 24.

26. The method defined in claim 24, where the test subroutine is failed, and a red indicator light is illuminated.

27. The method defined in claim 24, and including the additional steps of:
 (a) having the system determine that it had not been on before,
 (b) determining that the secure/nonsecure key was in the on position,
 (c) waiting a predetermined period of time,
 (d) having said means illuminate a green indicator light indicating to the operator that the system could be set up as desired.

28. The method defined in claim 27, and including the additional step of:
 (a) having the system inquire whether it is set up or not, and having the system not be set up, having the secure/nonsecure key in the "on" position, and determining that the test/setup button has been depressed,
 (b) determining that there is a telephone line connected to the system; and
 (c) entering the setup subroutine.

29. The method defined in claim 28, and including the additional steps of:
 (a) determining that said test/setup button has not been depressed,
 (b) determining that said mode/audit button has been depressed; and
 (c) entering the audit subroutine.

30. The method defined in claim 29, and including the additional steps of:
 (a) determining that the mode/audit button has not been depressed, and continuing to cycle until said setup button or said audit button is depressed.

31. The method defined in claim 27, and including the additional steps of:
 (a) determining that the secure/nonsecure key is in the off position,
 (b) checking to see if the system has been previously setup and determining that it has; and
 (c) initializing all registers and error counters.

32. The method defined in claim 24, and including the additional steps of:
 (a) determining that said voltage is within tolerance,
 (b) determining that a means to select has been activated,
 (c) determining that said secure/nonsecure key is in its off position,
 (d) determining that the test/setup push button has been depressed,
 (e) obtaining a line voltage; and
 (f) determining if said line voltage is an off hook or and on hook voltage.

33. The method defined in claim 32, wherein said line voltage is in off hook voltage, and including the additional steps of:
 (a) moving the stack pointer to an on hook file,
 (b) generating a file,
 (c) comparing the generated file to a previously generated file,
 (d) evaluating the result,
 (e) updating the present file data by substituting the just acquired file data for the old file data if the results are in limits; and
 (f) illuminating an appropriate indicator means.

34. The method defined in claim 32, wherein said line voltage is in off hook voltage and including the additional steps of:
 (a) moving the stack pointer to an off hook file,
 (b) generating a new file, (c) comparing the generated file to a previously generated file,
(d) determining if the newly generated file is in predetermined limits when compared to the previously generated file, and if said results are within predetermined limits,
(e) update the present file data by substituting the new file data for the previously stored data; and
(f) illuminating an appropriate indicator means.

35. The method defined in either one of claims 33, or 34, and
    (a) determining that the newly generated file is outside the predetermined limits when compared with the previously generated file,
    (b) asking if the test has been failed twice, and if it has not, repeating the steps in claims 33 or 34, and if the test has been failed two times, illuminating an appropriate indicator means to convey this result.

36. The method defined in claim 28, wherein said setup subroutine includes the steps of:
    (a) determining if there is a telephone line connected to the system,
    (b) generating line file data,
    (c) waiting a predetermined length of time,
    (d) illuminating an appropriate indicator light to alert the operator to take the telephone being measured off the hook,
    (e) determining that the voltage being measured is an off hook voltage,
    (f) waiting a predetermined length of time,
    (g) generating line file data,
    (h) waiting a second predetermined length of time,
    (i) storing the line file data; and
    (j) clearing all the registers and illuminating an appropriate indicator light.

37. The method defined in claim 29, wherein said audit subroutine includes the steps of:
    (a) checking to see if a character has been depressed on a computer terminal,
    (b) matching the baud rate of the system to the computer terminal,
    (c) displaying an appropriate opening message,
    (d) determining which character has been depressed; and
    (e) having the computer terminal perform the selected operation.

38. The method defined in claim 24, wherein said test subroutine includes the steps of:
    (a) checking for a line voltage error and incrementing the voltage error counter if a line voltage error has been encountered,
    (b) checking for a line current error and incrementing the line current error counter if a line current error has been encountered,
    (c) determining if a line reactance error has been encountered and incrementing the reactance counter if a line reactance error has been encountered,
    (d) determining if there are more than three current errors and setting the current error flag if there are.

39. The method defined in claim 38, and determining that there are not more than three current errors and reactance file errors, and setting the error flag if these then determining whether there are more than "N" are present.

40. The method defined in either one of claims 38 or 39 and determining whether a line voltage error is present.

41. The method defined in claim 40, and determining that a line voltage error is not present, and then determining whether any other error is present.

42. The method defined in claim 40, and including the steps of:
    (a) determining that a line error is present,
    (b) entering the test subroutine again, and if the second test is OK then exiting from the subroutine.

43. The method defined in claim 42, and determining the second test is not OK, and illuminating a red indicator light.

44. The method defined in claim 41, and determining that other errors are present and then illuminating a red indicator light.

* * * * *

UNITED STATES PATENT AND TRADEMARK OFFICE
CERTIFICATE OF CORRECTION

PATENT NO. : 4,760,592

DATED : July 26, 1988

INVENTOR(S) : Robert P. Hensley

It is certified that error appears in the above-identified patent and that said Letters Patent is hereby corrected as shown below:

Title page, Assignee: After "Secom General Corporation", insert --Computer Security Division--.

Col. 4, line 57, delete "sign" and insert --sine--;

Col. 5, line 37, delete "18" and insert --118--;

Col. 6, line 21, delete "restored" and insert --re-stored--;

Col. 12, line 31, delete "convertor" and insert --converter--;

Col. 15, line 53, delete "arrived" and insert --arrives--;
line 60, delete "mop" and insert --map--;

Col. 17, line 41, delete "sub routine" and insert --subroutine--;

Col. 16, line 38, delete "the";

Col. 18, line 2, delete "reset up" and insert --re set-up--.

Signed and Sealed this

Twenty-first Day of March, 1989

Attest:

DONALD J. QUIGG

Attesting Officer     Commissioner of Patents and Trademarks